United States Patent [19]

Katz

[11] Patent Number: 5,684,863
[45] Date of Patent: *Nov. 4, 1997

[54] TELEPHONIC-INTERFACE STATISTICAL ANALYSIS SYSTEM

[75] Inventor: Ronald A. Katz, Los Angeles, Calif.

[73] Assignee: Ronald A. Katz, Technology Lic. L.P., Los Angeles, Calif.

[*] Notice: The term of this patent shall not extend beyond the expiration date of Pat. No. 4,845,739.

[21] Appl. No.: 476,662

[22] Filed: Jun. 7, 1995

Related U.S. Application Data

[63] Continuation of Ser. No. 335,923, Apr. 10, 1989, which is a continuation of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.$^6$ .............. H04M 1/57; H04M 1/66; H04M 3/50; H04M 15/12
[52] U.S. Cl. .............. 379/88; 379/91; 379/112; 379/142; 379/196; 379/245; 379/265
[58] Field of Search .............. 379/88, 89, 67, 379/92, 91, 127, 142, 245, 246, 247, 201, 265, 266, 196, 197, 198, 112

[56] References Cited

U.S. PATENT DOCUMENTS

| | | | |
|---|---|---|---|
| 2,902,541 | 9/1959 | Singleton | 379/106 |
| 3,246,082 | 4/1966 | Levy . | |
| 3,393,272 | 7/1968 | Hanson . | |

(List continued on next page.)

FOREIGN PATENT DOCUMENTS

| | | |
|---|---|---|
| 66113/81 | 7/1981 | Australia . |
| 1022674 | 12/1977 | Canada . |
| 1025118 | 1/1978 | Canada . |
| 1056500 | 6/1979 | Canada . |
| 1059621 | 7/1979 | Canada . |
| 1162336 | 2/1984 | Canada . |
| 1225759 | 8/1987 | Canada . |
| 2009937-2 | 8/1990 | Canada . |

(List continued on next page.)

OTHER PUBLICATIONS

Lexis Search Results (Great American Potato-Chip giveaway/Raisin Bran Game/Giants Baseball Trivia—Dial Info): "In The Chips" AdWeek, Jul. 22, 1985.
"San-Fran-Police-League", Business Wire, Aug. 2, 1985.
"Similar Campaigns", DM News, Dec. 15, 1985.
"Phone Offers Action At Push Of Button", Advertising Age, Feb. 6, 1986.

(List continued on next page.)

*Primary Examiner*—Thomas W. Brown
*Attorney, Agent, or Firm*—Darby & Darby, P.C.

[57] ABSTRACT

A system D interfaces with a multiplicity of individual terminals T1–Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

202 Claims, 6 Drawing Sheets

U.S. PATENT DOCUMENTS

| | | | |
|---|---|---|---|
| 3,394,246 | 7/1968 | Goldman | 235/380 |
| 3,544,769 | 12/1970 | Hedin | 235/379 |
| 3,594,004 | 7/1971 | Barr | 273/139 |
| 3,617,638 | 11/1971 | Jochimsen et al. | 379/91 |
| 3,644,675 | 2/1972 | Waltington | 379/92 |
| 3,688,126 | 8/1972 | Klein. | |
| 3,696,335 | 10/1972 | Lemelson | 340/825.33 |
| 3,794,774 | 2/1974 | Kemmerly et al.. | |
| 3,800,283 | 3/1974 | Gropper | 379/91 |
| 3,881,160 | 4/1975 | Ross | 333/124 |
| 3,889,050 | 6/1975 | Thompson | 348/6 |
| 3,909,553 | 9/1975 | Marshall. | |
| 3,912,874 | 10/1975 | Botterell et al. | 379/201 |
| 3,918,174 | 11/1975 | Miller et al. | 434/346 |
| 3,934,095 | 1/1976 | Matthews et al. | 379/67 |
| 3,947,972 | 4/1976 | Freeman. | |
| 3,950,618 | 4/1976 | Bloisi | 379/92 |
| 3,998,465 | 12/1976 | Mascola | 273/139 |
| 4,017,835 | 4/1977 | Randolph | 379/91 |
| 4,054,756 | 10/1977 | Comella et al. | 379/89 |
| 4,078,316 | 3/1978 | Freeman. | |
| 4,090,038 | 5/1978 | Biggs | 379/393 |
| 4,117,278 | 9/1978 | Ehrlich et al. | 379/34 |
| 4,121,052 | 10/1978 | Richard | 379/96 |
| 4,145,578 | 3/1979 | Orriss | 379/188 |
| 4,162,377 | 7/1979 | Mearns | 379/127 |
| 4,191,376 | 3/1980 | Goldman | 273/139 |
| 4,191,860 | 3/1980 | Weber | 379/115 |
| 4,194,089 | 3/1980 | Hashimoto | 379/76 |
| 4,241,942 | 12/1980 | Bachman | 283/102 |
| 4,242,539 | 12/1980 | Hashimoto | 379/142 |
| 4,243,844 | 1/1981 | Waldman | 379/442 |
| 4,255,618 | 3/1981 | Danner et al. | 379/88 X |
| 4,264,924 | 4/1981 | Freeman. | |
| 4,264,925 | 4/1981 | Freeman et al.. | |
| 4,277,649 | 7/1981 | Sheinbein | 379/201 |
| 4,299,637 | 11/1981 | Oberdeck et al. | 156/64 |
| 4,302,810 | 11/1981 | Bouricius et al. | 380/24 |
| 4,314,103 | 2/1982 | Wilson | 379/77 |
| 4,345,315 | 8/1982 | Cadotte et al. | 379/92 |
| 4,348,554 | 9/1982 | Asmuth | 379/113 |
| 4,355,207 | 10/1982 | Curtin | 379/67 |
| 4,360,827 | 11/1982 | Braun | 348/15 |
| 4,376,875 | 3/1983 | Beirne | 379/88 |
| 4,398,708 | 8/1983 | Goldman et al.. | |
| 4,439,636 | 3/1984 | Newkirk et al. | 379/123 |
| 4,468,528 | 8/1984 | Reece et al. | 379/84 |
| 4,489,438 | 12/1984 | Hughes | 381/51 |
| 4,490,583 | 12/1984 | Bednarz et al. | 379/158 |
| 4,521,643 | 6/1985 | Dupuis et al. | 379/49 |
| 4,523,055 | 6/1985 | Hohl et al. | 379/89 |
| 4,532,378 | 7/1985 | Nakayama et al. | 379/110 |
| 4,541,087 | 9/1985 | Comstock | 370/263 |
| 4,549,047 | 10/1985 | Brian et al. | 379/88 |
| 4,555,594 | 11/1985 | Friedes et al. | 379/220 |
| 4,559,415 | 12/1985 | Bernard et al. | 379/95 |
| 4,562,342 | 12/1985 | Solo | 235/380 |
| 4,567,359 | 1/1986 | Lockwood | 235/381 |
| 4,570,930 | 2/1986 | Matheson | 273/434 |
| 4,578,700 | 3/1986 | Roberts et al. | 379/92 |
| 4,582,956 | 4/1986 | Doughty | 379/94 |
| 4,584,602 | 4/1986 | Nakagawa | 379/92 |
| 4,585,906 | 4/1986 | Matthews et al. | 379/88 |
| 4,586,707 | 5/1986 | McNeight et al. | 273/430 |
| 4,587,379 | 5/1986 | Masuda | 379/91 |
| 4,591,190 | 5/1986 | Clark | 283/102 |
| 4,614,367 | 9/1986 | Breen | 283/102 |
| 4,625,276 | 11/1986 | Benton et al. | 364/408 |
| 4,630,200 | 12/1986 | Ohmae et al. | 364/405 |
| 4,630,201 | 12/1986 | White | 364/408 |
| 4,634,809 | 1/1987 | Paulsson et al. | 379/91 |
| 4,649,563 | 3/1987 | Riskin | 379/97 |
| 4,652,998 | 3/1987 | Koza | 463/26 |
| 4,658,417 | 4/1987 | Hashimoto et al. | 379/97 |
| 4,663,777 | 5/1987 | Szeto | 379/88 |
| 4,671,512 | 6/1987 | Bachman et al. | 273/139 |
| 4,674,044 | 6/1987 | Kalmus et al. | 364/408 |
| 4,677,553 | 6/1987 | Roberts et al. | 463/17 |
| 4,694,490 | 9/1987 | Harvey et al. | 380/20 |
| 4,697,282 | 9/1987 | Winter et al. | 379/67 |
| 4,704,725 | 11/1987 | Harvey et al. | 380/9 |
| 4,706,275 | 11/1987 | Kamil | 397/144 |
| 4,716,583 | 12/1987 | Groner et al. | 379/88 |
| 4,745,468 | 5/1988 | Von Kohorn | 348/13 |
| 4,756,020 | 7/1988 | Fodale | 379/112 |
| 4,757,267 | 7/1988 | Riskin | 379/113 |
| 4,761,684 | 8/1988 | Clark et al. | 379/105 X |
| 4,764,666 | 8/1988 | Bergeron | 463/25 |
| 4,766,604 | 8/1988 | Axberg | 379/67 |
| 4,774,655 | 9/1988 | Kollin et al. | 395/604 |
| 4,781,377 | 11/1988 | McVean et al. | 273/86 R |
| 4,785,408 | 11/1988 | Britton et al. | 395/2.79 |
| 4,788,682 | 11/1988 | Vij et al. | 370/110.1 |
| 4,788,715 | 11/1988 | Lee | 379/84 |
| 4,788,718 | 11/1988 | McNabb et al. | 379/113 |
| 4,792,968 | 12/1988 | Katz | 379/92 |
| 4,796,293 | 1/1989 | Blinken et al. | 379/202 |
| 4,797,910 | 1/1989 | Daudelin | 379/67 |
| 4,797,911 | 1/1989 | Szlam et al. | 379/67 |
| 4,797,913 | 1/1989 | Kaplan et al. | 379/91 |
| 4,805,209 | 2/1989 | Baker, Jr. et al. | 379/96 |
| 4,812,843 | 3/1989 | Champion, III et al. | 340/905 |
| 4,815,121 | 3/1989 | Yoshida | 379/67 |
| 4,827,500 | 5/1989 | Binkerd et al. | 379/88 |
| 4,842,278 | 6/1989 | Markowicz | 463/18 |
| 4,845,739 | 7/1989 | Katz | 379/92 |
| 4,847,890 | 7/1989 | Solomon et al. | 379/67 |
| 4,852,154 | 7/1989 | Lewis et al. | 379/105 |
| 4,866,756 | 9/1989 | Crane et al. | 379/88 |
| 4,882,473 | 11/1989 | Bergeron et al. | 463/25 |
| 4,893,328 | 1/1990 | Peacock | 379/67 |
| 4,894,857 | 1/1990 | Szlam et al. | 379/67 |
| 4,896,345 | 1/1990 | Thorne | 379/67 |
| 4,897,867 | 1/1990 | Foster | 379/94 |
| 4,899,375 | 2/1990 | Bauer et al. | 379/264 |
| 4,907,079 | 3/1990 | Turner et al. | 379/92 X |
| 4,922,522 | 5/1990 | Scanlon | 463/17 |
| 4,937,853 | 6/1990 | Brule et al. | 379/96 |
| 4,942,598 | 7/1990 | Davis | 379/67 X |
| 4,942,599 | 7/1990 | Gordon et al. | 379/93 |
| 4,964,157 | 10/1990 | Aoshima | 379/204 |
| 4,965,825 | 10/1990 | Harvey et al. | 380/9 |
| 4,969,185 | 11/1990 | Dorst et al. | 379/209 |
| 4,972,461 | 11/1990 | Brown et al. | 379/67 |
| 4,989,233 | 1/1991 | Schakowsky et al. | 379/92 |
| 4,996,705 | 2/1991 | Entenmann et al. | 379/91 |
| 5,001,710 | 3/1991 | Gawrys et al. | 370/110.1 |
| 5,003,574 | 3/1991 | Denq et al. | 379/75 |
| 5,014,298 | 5/1991 | Katz | 379/93 |
| 5,017,917 | 5/1991 | Fisher et al. | 340/825.79 |
| 5,018,736 | 5/1991 | Pearson et al. | 463/29 |
| 5,023,904 | 6/1991 | Kaplan et al. | 379/91 |
| 5,046,183 | 9/1991 | Dorst et al. | 370/262 |
| 5,083,272 | 1/1992 | Walker et al. | 364/412 |
| 5,097,528 | 3/1992 | Gursahaney et al. | 379/67 |
| 5,109,414 | 4/1992 | Harvey et al. | 380/9 |
| 5,127,003 | 6/1992 | Doll, Jr. et al. | 370/259 |
| 5,146,491 | 9/1992 | Silver et al. | 379/114 |
| 5,181,238 | 1/1993 | Medamana et al. | 379/95 |
| 5,233,654 | 8/1993 | Harvey et al. | 380/20 |
| 5,255,183 | 10/1993 | Katz | 395/230 |
| 5,263,723 | 11/1993 | Pearson et al. | 463/41 |

| | | |
|---|---|---|
| 5,333,185 | 7/1994 | Burke et al. ............................ 379/127 |
| 5,335,277 | 8/1994 | Harvey et al. .......................... 380/20 |
| 5,351,276 | 9/1994 | Doll, Jr. et al. ........................ 379/67 |
| 5,353,335 | 10/1994 | D'Urso et al. ......................... 379/67 |

FOREIGN PATENT DOCUMENTS

| | | |
|---|---|---|
| 0 120 322 | 2/1984 | European Pat. Off. . |
| 0 229 170 A | 7/1987 | European Pat. Off. . |
| 0249575 | 12/1987 | European Pat. Off. . |
| 0295837 | 12/1988 | European Pat. Off. . |
| 0342295 | 11/1989 | European Pat. Off. . |
| 0434181 | 6/1991 | European Pat. Off. . |
| 0 568 114 A | 11/1993 | European Pat. Off. . |
| 0 620 669 A | 10/1994 | European Pat. Off. . |
| 9002131 | 8/1990 | France . |
| OS 2929416 | 2/1981 | Germany . |
| OS 3726366 | 2/1988 | Germany . |
| 4005365 A1 | 8/1990 | Germany . |
| 52-17740 | 9/1977 | Japan . |
| 56-152365 | 11/1981 | Japan . |
| 500138/88 | 1/1988 | Japan . |
| 298158/90 | 12/1990 | Japan . |
| 41855/91 | 2/1991 | Japan . |
| 2184327 | 6/1987 | United Kingdom . |
| 2 230 403 | 10/1990 | United Kingdom . |
| WO 87/00375 | 1/1987 | WIPO . |
| WO88/02966 | 4/1988 | WIPO . |
| WO88/05985 | 8/1988 | WIPO . |
| WO89/02139 | 3/1989 | WIPO . |
| WO89/09530 | 10/1989 | WIPO . |
| WO93/05483 | 3/1993 | WIPO . |

OTHER PUBLICATIONS

Boies, Stephen J., "A Computer Based Audio Communication System", *Computer Sciences Department*, Thomas J. Watson Research Center, Yorktown Heights, New York, USA, pp. 701–704—(Article) (undated).

Winckelmann, W.A., "Automatic Intercept Service", *Bell Laboratories Record.*, May 1968, vol 46, No. 5, pp. 138, 143–(Article).

"Proposed Agreement Between National Enterprises Board (N.E.B.) and Delphi", Jan. 30. 1979.

Voysey, Hedley, "Nexos wins rights to comms engine", *Computing*, Sep. 6, ??, vol. 7, No. 36–(Article).

"Appraisal Of The Fair Market Value Of Delphi Communications", Apr. 30, 1980–(Study) Delphi Communications–(Charts and Exhibits).

"Voice–Response System Improves Order Entry, Inventory Control", *Communication News*, Aug. 1976–(Article).

"Periphonics VOICEPACK.",–(Brochure) (undated).

"The Voice Response Peripheral That Touch–Tone Telephone Into A Computer Terminal", Periphonics Corporation–(Brochure)–(undated).

Rabin, Jeff, "Minorities Seek 30% Share of All Lottery Operations", *Sacramento Bee*, Apr. 12, 1985–(Article).

Advertisements (Dial Giants Baseball Trivia Game): *San Francisco Chronicle*, Jul. 3, 1984.

Curtis, Cathy, "976 numbers let you dial–a–whatever", *San Francisco Business Journal*, Nov. 26, 1984–(Article).

Ferrell, Jane, "Three little numbers for instant information", *San Francisco Chronicle*, Aug. 15, 1984–(Article).

"Dallas Telephone Call–in Game Uses Computer Voice Interface", Sep. 24, 1984–(Press Release).

Rivest, R.L., et al., "A Method for Obtaining Digital Signatures and Public–Key Cryptosystems", *Communications of the ACM*, Feb. 1978, vol. 21, No. 2, pp. 120–126–(Article).

Finnigan, Paul F. "Audiotex: The telephone as data–access equipment", *Data Communications*, 1987, pp. 155–161 (Article).

Ozawa, Y., et al., "Voice Response System and Its Applications", *Hitachi Review*, Dec. 1979, vol. 28, No. 6, pp. 301–305–(Article).

"AT&T 2: Reaches agreement with Rockwell (ROK)", Aug. 26, 1986–(Press Release).

"AT&T: Expands Computer speech system product line", Apr. 14, 1986–(Press Release).

Adams, Cynthia, "Conversing With Computers", *Computerworld on Communications* May 18, 1983, vol. 17, No. 20A, pp. 36–44–(Article).

Hester, S.D., et al., "The AT&T Multi–Mode Voice Systems–Full Spectrum Solutions For Speech Processing Applications", Sep. 1985, pp. 1–10–(Proceedings Of The 1985 AVIOS Conference).

Davidson, Leon, "A Pushbutton Telephone For Alphanumeric Input", *Detamation.*, Apr. 1966, pp. 27–30–(Article).

Advertisement: Cuervo Gold Beach Chair, VoiceMail Int'l, '83.

"Digital's All–In–1 Voice Messaging", *Digital*–(Brochure) (undated).

"Access Voice and Mail Messages From One Familiar Source",*Insight*,–(Article) (undated).

"Get The Message . . . ! New VoiceMail Features", *Voicemail International, Inc.*, Oct. 1984–(Article).

Brochures (TWA Crew Scheduling/PSA's Reservation System/Universal Studios Program/Dow Phone): "AVIAR The communication system that keeps you flying", VoiceMail Int'l,–(Brochure) (undated).

"TWA VOICEMAIL, Flight Attendants Users Guide" Aug. 1986,–(Brochure).

Holtzman, Henry, "Voice Mail Soars At TWA", *Modern Office Technology* (Reprint), Mar. 1986,–(Article).

"Bid Results via VOICEMAIL—Flight Deck Crew Members", May 1, 1985 (Script).

Borden, W.S., "Flight Attendant Self Input Of Monthly Bids Via Touch Tone Telephone", *In:Flight Services Bulletin*, Sep. 15, 1985–(Memo).

"Look Ma, no operators! Automatic voice system doesmany airline jobs", *Air Transport World*, Oct. 1986 (Article).

"1,000,000 Shares Common Stock" *Voicemail International, Inc.*, Jan. 10, 1984–(Public Offering Summary).

Levinson, S.E., et al., "A Conversational–Mode Airline Information and Reservation System Using Speech Input and Output", *The Bell System Technical Journal*, Jan. 1980, vol. 59, No. 1, pp. 119–137.

Emerson. S.T., "Voice Response Systems—Technology to the Rescue for Business Users", *Speech Technology*, Jan./Feb. '83. pp. 99–103–(Article).

Moslow, Jim, "Emergency reporting system for small communities", *Telephony*, Feb. 11, 1985, pp. 30–32, 34–(Article).

Rabiner, L.R., et al, "Digital Techniques for Computer Voice Response: Implementation and Applications", *Proceedings Of The IEEE*, Apr. 1976, vol. 64, No. 4, pp. 416–432–(Article).

Moosemiller, J.P., "AT&T's CONVERSANT™ I Voice System" *Speech Technology*, Mar./Apr. 1986, pp. 88–93 (Article).

Frank, R.J., et al., "No. 4 ESS: Mass Announcement Capability", *The Bell System Technical Journal*, Jul./Aug. 1981, vol. 60, No. 6, Part 2, pp, 1049–1081–(Chapter from a Book).

"Chapter I General Description"*D.I.A.L. PRM/Release 3—Version 2* Mar. 1987 (Product Reference Manual).

"Announcing Release 3.3"*D-A-S-H-D.I.A.L. Application and Support Hints*, Jan./Feb. Mar. 1987, vol. 3, No. 1 (Brochure).

"D.I.A.L. Software Relase 4", OPCOM, Jan. 1988, Version 1–(Product Reference Manual).

Brady, R.L., et al., "Telephone Identifier Interface", *IBM Technical Disclosure Bulletin*, Oct. 1976. vol. 19, No. 5, pp. 1569–1571–(Article).

Corbett, A.J., "Telephone Enquiry System Using Synthetic Speech", *University of Essex*, Dec. 1974, (Thesis).

Yoshizawa, K., et al., "Voice Response System for Telephone Betting", *Hitachi Review*, Jun. 1977, Vol. 26, No. 6–(Article).

Sagawa, S., et al., "Automatic Seat Reservation By Touch-Tone Telephone", *Second USA Japan Computer Conference*, 1975, vol. 2, pp. 290–294–(Article).

Smith, S.L., "Computer-Generated Speech and Man-Computer Interaction", *Human Factors*, 1970, 12(2), pp. 215–223–(Article).

Newhouse, A., et al., "On The Use Of Very Low Cost Terminals", *University of Houston*, pp. 240–249–(Paper)–(undated).

Mullen. R.W.. "Telephone—home's 'friendliest' Computer", *Inside Telephone Engineer And Management*, May 15, 1985, vol 89. No. 10,–(Article).

"Telephone Computing Entering Service Bureau Business", *American Banker*, Jul. 5, 1979–(Article).

Kutler, Jeffrey, "Technology, System Sharing Improve Phone Baking Outlook", *American Banker.*, Dec. 7, 1979, vol. CXLIV, No. 237–(Article).

Kutler, Jeffrey, "Phone Bill Paying Accessed by Pioneer", *American Banker.*, Dec. 7, 1979, vol. CXLIV, No. 237–(Article).

"Audiotax Information From Dow Jones", *The Computer Review*, Nov. 1994 vol. 2 No. 1–(Article).

"User's Guide", *Dowphone*–(undated).

"Dow Phone Adds Innovest Systems' Technical Analysis Reports" *IDP Report*, Jan. 3, 1986–(Report).

Perdue, R.J., et al., "Conversant 1 Voice System: Architecture and Applications", *AT&T Technical Journal*, Sep./Oct. 1986–(Article).

Martin, James, "Design of Man-Computer Dialogues", *IBM System Research Institute*, Chapter 16, pp. 283–306 (Chapter from a Book) (undated).

Kaiserman, D.B., "The Role Of Audio Response In Data Collection Systems", *Proceedings of the Technical Sessions*, Paleis des Expositions, Geneva, Switzerland, Jun. 17–19, 1980, pp. 247–251–(Article).

Boies, S.J., et al., "User Interface for Audio Communication System", *IBM Technical Disclosure*, Bulletin, Dec. 1982, vol. 25. No. 7A, pp. 3371–3377–(Article).

Kramer, J.J., "Human Factors Problems in the Use of Pushbutton Telephones for Data Entry", *Bell Telephone Laboratories*, Holmdel, N.J., Apr. '74, pp. 241–258–(Paper).

Cox, Jr., Floyd, "Flora Fax", Jan. 22, 1986—(Letter and Advertisements).

Isayama, Tetsuya, "Automatic Response Processing Equipment as a Multi-media Communication Node", *Japan Telecommunications Review*, 1987, vol. 29, No. 1, pp. 29–36–(Article).

Imai, Y.. et al., "Shared Audio Information System Using New Audio Response Unit" *Japan Telecommunications Review*, Oct. 1981, vol. 23. No. 4, pp. 383–390–(Article).

"Distrust of computer kills home service plan"–(date and source missing).

"Automatic Call Distributor/Management Information System: Interface between 1/1AESS™ Switch Central Office and Customer Premises Equipment", *Bell Communications Research*, Dec. 1986, Technical Reference TR–TSY–000306, Issue 1–(Article).

"Comparison Of ACD Systems", *Connection*, Feb. 1990–(Chart).

"ACD Comparison", *Aspect*, Feb; 2, 1990–(Final Report).

C.R. Newson, "Merlin Voice Mail VM600," British Telecommunications Engineering, vol. 4, Apr. 1985, pp. 32–35.

A.S. Yatagai, "Telephonic Voice Synthesis Systems," Telecommunications, Aug. 1985, pp. 56h–I, 68.

A.J. Waite, "Getting Personal With New Technologies For Telemarketers," DM News, Feb. 15, 1987 at 50.

"Shopping via a network is no longer just talk," Data Communications, Aug. 1981 at 43.

"Growth-Oriented Systems, " Restaurant Technology, Nation's Restaurant News Newspaper, Jul. 1, 1985 at 51.

"Let your fingers do the tapping . . . and the computer the talking," Modern Office Tech., May 1994 at 80.

"American Software unveils systems for IBM mainframes," Computerworld, Mar. 26, 1984 at 59.

"Business Units Get Order Entry," Computerworld, Jul. 12, 1982 at 36.

Kroemer, F., "TELEBOX", Unterrichtsblätter, year 38/1985, No. 4, pp. 131–141 (Article)–no translation.

Kroemer, F., "TELEBOX", Unterrichtsblätter, year 41/1988, No. 2, pp. 67–83 (Article)–no translation.

Borison, V.S., "TRANSACTION—telephone gets the fact at the point of sale", *Bell Laboratories Record*, Oct. 1975, pp. 377–383–(Article).

Demeautis, M., et al., "The TV 200 A Transactional Telephone", *Commutation & Transmission* n° 5, 1985, pp. 71–82–(Article).

Eriksson, G., et al., "Voice and Data Workstations and Services in the ISDN", *Ericsson Review.*, May 1984, pp. 14–19–(Article).

Schrage, Michael, "A Game Von Meister in Pursuit of Profits", *Washington Post*, Sep. 23, 1985–(Article).

Svigals, J., "Low Cost Point-Of-Sale Terminal", *IBM Technical Disclosure Bulletin*, Sep. 1982, vol. 25, No. 4, p. 1835.

Turbat, A., "Telepayment And Electronic Money The Smart Card", *Commutation & Transmission* n° 5, 1982, pp. 11–20–(Article).

"Voice Mail", *Sound & Communications*, Apr. 1983, vol. 28 No. 12, pp. 84–85–(Article).

FIG. 2

| CALLER'S TELEPHONE NUMBER AND INITIALS | DATA: AGE, WEIGHT---PULSE | CALL RECORD SEQUENCE | ASSIGNED DESIGNATION | } | ACKNOWLEDGE DIGITS |
|---|---|---|---|---|---|
| 627-2222-53 | 47 176........77 | 4951 | 4951684 | | 6173 |

| CARD TYPE | CARD # | CARD EXP. DATE | CUST. # | NAME ADDRESS DATA | ITEM 1 | COLOR SIZE CODE | } | ACKNOWLEDGE DIGITS |
|---|---|---|---|---|---|---|---|---|

| CALLER'S TELEPHONE NUMBER | USES/ MONTH | TIME | I.D. DATA | | DESIGNATION | QUESTION ANSWERS |
|---|---|---|---|---|---|---|

201 — 202 — 204 — 206 — 208 — 210

200

TELEPHONIC-INTERFACE STATISTICAL ANALYSIS SYSTEM

This is a continuation application of application Ser. No. 07/335,923 filed Apr. 10, 1989, and entitled "Telephonic-Interface Statistical Analysis System", which is a continuation of application Ser. No. 07/194,258 filed May 16, 1988, and entitled "Telephonic-Interface Statistical Analysis System", now U.S. Pat. No. 4,845,739, which is a continuation-in-part of application Ser. No. 07/018,244 filed Feb. 24, 1987, and entitled "Statistical Analysis System For Use With Public Communication Facility", now U.S. Pat. 4,792,968, which is a continuation-in-part of application Ser. No. 06/753,299 filed Jul. 10, 1985, and entitled "Statistical Analysis System For Use With Public Communication Facility", now abandoned.

BACKGROUND AND SUMMARY OF THE INVENTION

Various forms of publicly accessible communication systems for providing access to a central station have been proposed, some involving telecommunications. However, sometimes a need for ancillary functions arise in that regard, e.g. it may be desirable to positively identify a large group of persons, as a demographically controlled group, or a specifically entitled group, then statistically analyze data from the group so as to accurately identify certain persons in the group and select a subset of at least one person. Specifically, it may be desirable to obtain medical data from an entitled group of people, to correlate such data, perhaps introduce external data, then identify a select subset of the group. In that regard, a need exists for an improved, effective, economical, and expedient system of telecommunication incorporating means for performing qualification, identification, analysis and selection of individual persons.

It has been proposed to interface persons at telephone calling stations directly with a computer facility. In accordance with such arrangements, recorded voice messages prompt callers to provide data by actuating the alphanumeric buttons that are conventionally employed for dialing from one telephone station to another. In one prior arrangement, a caller may actuate dialing buttons to selectively attain a communication channel or to address specific information in a computer. In another arrangement, dialing buttons may be actuated to specify a billing designation as for requested services. Generally, such systems are believed to have been somewhat limited in scope, often involving difficulties that are frustrating or confusing to a caller. Nevertheless, such techniques have been widely used to enhance and broaden communication.

In general, the present invention comprises a telephonic-interface system and related process for selectively utilizing both analog (voice) and digital telephonic communication in a variety of different interface formats or programs, as to select or qualify a set of callers, enable positive identification of at least certain of the callers in the set, acquire data from callers in the set, statistically analyze acquired data, as in combination and in association with external data (time independent), and accordingly to isolate a subset of the callers with verifiable identification. That is, the external data (separate from caller-provided data) may be introduced at any of a variety of different times in relation to the caller data.

For example, a voice origination apparatus may prompt individual callers who (after qualification) provide select digital data to develop a record for further processing either immediately, upon the evolution of a defined set of callers or upon the establishment of select external data. Thus, following a qualification phase, the information acquisition phase may be concurrent or consecutive with respect to the processing phase. When appropriate, abort capability allows a caller to remain "off hook" and go to analog (vocal) communication. The caller then interfaces directly with an operator.

The system of the present invention may qualify an entitled set of callers, then receive answer data in the course of the call and develop identification or designation data, sequence data and statistical data. The system may then provide data cells for storing individual data while assigning confirmable identifications to the entitled set. From the set, a subset is defined. That is, in accordance with various formats, acquired data is processed in statistical relationship, or in relation to applied external data to accomplish such functional operating formats as an auction sale, a contest, a lottery, a poll, a merchandising operation, a game, and so on.

A variety of memory techniques are used to selectively activate the voice origination apparatus. Accordingly, statistical analysis and selection can be effectively and economically accomplished with respect to a substantial set of callers who are accommodated individual communication through a telephone system.

BRIEF DESCRIPTION OF THE DRAWINGS

In the drawings, which constitute a part of this specification, exemplary embodiments exhibiting various objectives and features hereof are set forth, specifically:

FIG. 2 is a fragmentary diagrammatic representation of a storage cell format as may be developed in the system of FIG. 1;

FIG. 5 is a fragmentary diagrammatic representation of a storage cell format as may be developed in the system of FIG. 1 with the processor of FIG. 4;

FIG. 7 is a diagrammatic representation of a storage cell format as may be developed in the system of FIG. 4;

DESCRIPTION OF THE ILLUSTRATIVE EMBODIMENTS

As required, detailed illustrative embodiments of the present invention are disclosed herein. However, physical communication systems, data formats, and operating structures in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
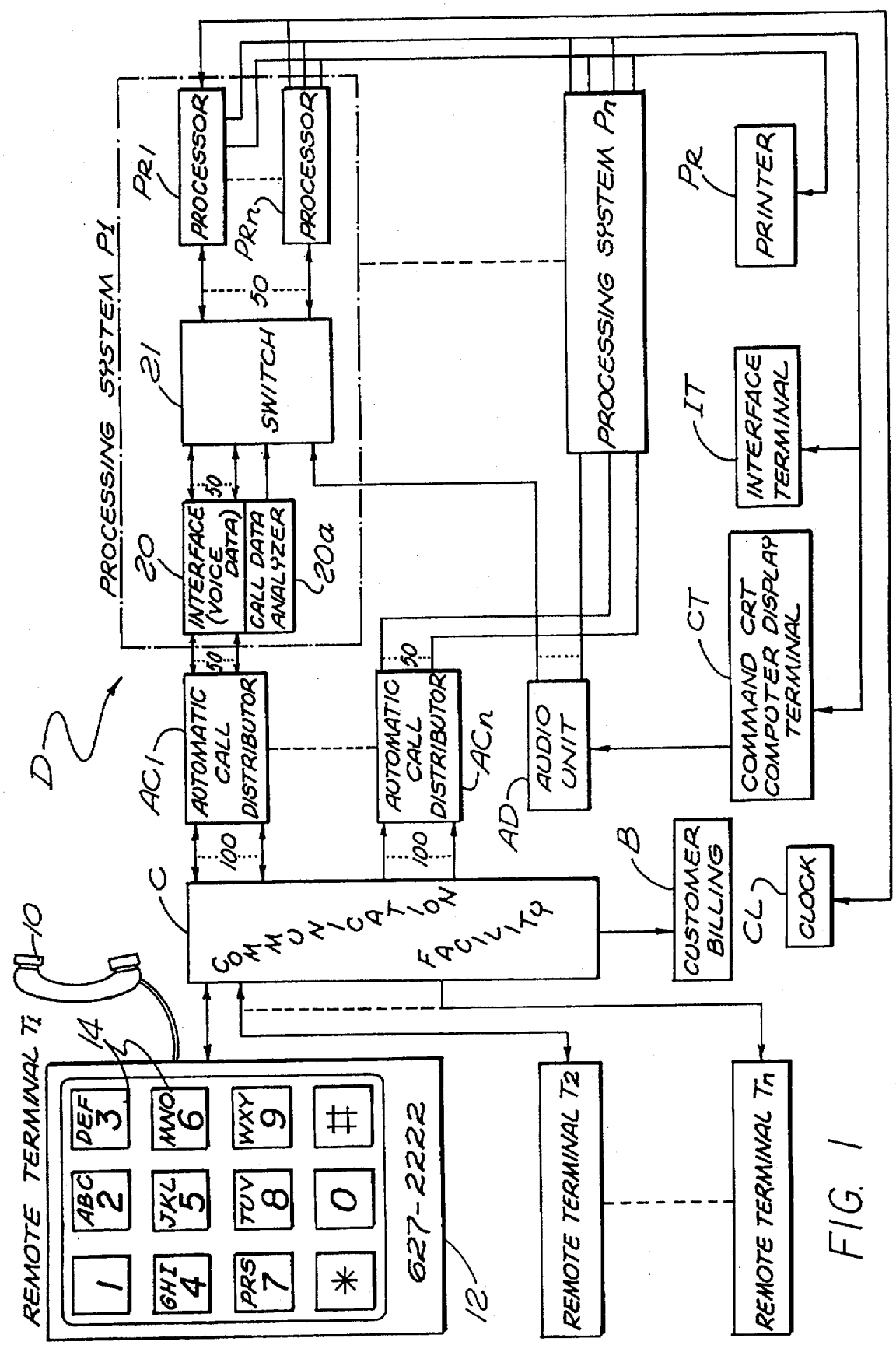
FIG. 1 is a block diagram of a system constructed in accordance with the present invention.

Referring initially to FIG. 1, a series of remote telephone-instrument terminals T1 through Tn are represented (left). The terminals are generally similar, and accordingly, only the terminal T1 is illustrated in detail.

In the disclosed embodiment, the remote terminals T1 through Tn represent the multitude of conventional telephone terminals that are coupled to a communication facility C which may take the form of a comprehensive public telephone system for interconnecting any associated terminals T1–Tn. In accordance with the present system, the terminals T1–Tn operate through the communication facility C to be coupled with a central station D, an embodiment of which is illustrated in some detail.

Generally in accordance with the present development, individual callers use the individual telephone stations T1 through Tn to interface the station D through the communication facility C. Callers may be screened or qualified. Also in accordance herewith, the data of individual callers may be collected, correlated and tested in the station D for processing in accordance with various programs and external data. As a consequence, various objectives are accomplished. For example, a select subset of the callers may be isolated and specifically identified, or related data may be processed, or transactions may be actuated. The possibilities for application of the system are substantial and varied as will be apparent from the exemplary structure and functions as described in detail below.

In one operating process format, the public might be polled with regard to locating the specific purchasers of a defective or dangerous product. Alternatively, the public might be polled with the objective of locating persons susceptible to a specific ailment or disease. Public auctions of unprecedented participation are possible. Legal lotteries are enabled that are interesting, effective and very economical on an individual participant basis. The system also might be employed in various game formats or to automate a promotion or mail-order operation, even to the extent of including inventory control as detailed below.

In each functional operating format, the callers may be variously qualified on the basis of entitlement and may be identified for subsequent verification. The callers then may be prompted, either through the interface or externally, to provide appropriate data.

Considering the system of FIG. 1 in somewhat greater detail, it is to be understood that the communication facility C has multiplexing capability for individually coupling the terminals T1–Tn to the central station D on request. In the illustrative embodiment of the system, the communication facility C comprises a public telephone network and the individual terminals T1–Tn take the various forms of existing traditional or conventional telephone instruments.

The exemplary telephone terminal T1 is represented in some detail to include a hand piece 10 (microphone and earphone) and a panel 12 provided with a rectangular array of push buttons 14 in the conventional configuration. Of course, the hand piece 10 accommodates analog signals while the panel 12 is a digital apparatus. Generally in accordance herewith, the hand piece 10 serves to manifest analog signals vocally to the caller.

In accordance with conventional telephone practice, alphabetic and numeric designations are provided on the buttons 14. For example, several of the buttons 14 carry three letters along with a decimal digit. Specifically, the button designated with the numeral "2" also carries the letters "A", "B" and "C". In that manner, the buttons 14 encompass the numerals "0–9", two symbols, and the alphabet except for the letters "Q" and "Z". Consequently, the buttons 14 accommodate the entry of decimal data, and to some extent alphabetic data.

The buttons 14 designated with symbols "*" and "#", along with the numeral "0", can be used by predetermined assignment to represent the letters "Q" and "Z" or any of a variety of other data or command components. Generally, in accordance herewith, the buttons 14 are employed to formulate digital data at the central station D in various formats determined by the instant specific use and operating format of the system.

Considering the central station D in somewhat greater detail, the communication facility C is coupled to interface a series of processing systems P1 through Pn (FIG. 1, left). Specifically, the communication facility C is connected to the processing systems P1–Pn through an associated series of automatic call distributors AC1 through ACn. Each of the automatic call distributors AC1–ACn accommodates one hundred lines from the communication facility C and accordingly, may accommodate and queue up to 100 calls.

Each of the automatic call distributors AC1–ACn may take various forms as well known in the prior art, functioning to queue incoming calls for connection to a lesser number of lines. In the disclosed embodiment, from each of the call distributors AC1–ACn, fifty lines are connected respectively to the individual data processing systems P1–Pn through an interface 20 and a switch 21. Thus, in the disclosed embodiment, each of the automatic call distributors AC1–ACn can accommodate one hundred lines, fifty of which may be active in association with one of the processing systems P.

The processing systems P1–Pn are similar, therefore, only the processing system P1 is shown in any detail. Collectively, the processing systems P1–Pn are interconnected with a command computer terminal CT, at least one interface terminal IT, at least one printer PR and an audio unit AD. The command terminal CT is separately coupled to the audio unit AD.

As represented, the processing systems P1 through Pn each contain a number of individual function units or processors PR1 through PRn. Although various other configurations and arrangements may be employed, the explanation is facilitated by including a plurality of individual function units as treated in detail below.

Considering the processing system P1, fifty lines from the automatic call distributor AC1 are connected to the interface 20, an exemplary form of which may be a commercially available Centrum 9000 unit. The interface 20 incorporates modems, tone decoders, switching mechanisms, DNIS and ANI capability (call data analyzer 20a) along with voice interface capability. Note that the interface may actually perform analysis on data. However, to preserve the disclosed embodiment manageable, major analysis is explained with reference to processors.

Generally, DNIS capability is a function of the communication facility C (composite telephone system) to provide called terminal digital data indicating the called number. ANI capability is a similar function whereby the digital data indicates the calling number with calling terminal digital signals. Both capabilities are available for use with equipment as the interface 20 and to provide control through the call data analyzer 20a.

Accommodating up to fifty independent calls on separate communication paths to the central station D, the interface 20 is capable of providing analog (voice) signals to prompt each caller. Also accommodated are digital signals including the DNIS and ANI signals. The system contemplates the possibility of utilizing sequences of lines in rotary as well as blocking sequences of lines, the numbers for which command a particular program or operation format of a function unit as disclosed in detail below.

The interface 20 provides the connection of the fifty lines to a switch 21 which is in turn coupled to fifty function units, or processors PR1–PRn. As indicated above, multiple function units, or processors, are described in the disclosed embodiment to facilitate the explanation. Of course, non-parallel techniques and multiplexed operations might well be employed as alternatives. For a similar reason, as disclosed herein, each of the processors PR1–PRn includes memory cells for each of the callers' individual data. Development and compilation of data in such cells according to various operating formats is described below. In the disclosed embodiment, the processors PR1–PRn are connected collectively to the command computer terminal CT (incorporating a CRT display), the interface terminal IT, and the printer PR. Note that the CRT display serves to visually display data regarding select subsets as explained in detail below.

Exemplary detailed structures for the processors PR1–PRn are described below; however, in general, the units may comprise a microcomputer, for example, programmed as suggested above and as disclosed in detail below to accomplish specific operating formats. As an integral part of such formats, a caller may be qualified as belonging to an entitled set of persons or to accommodate specific demographic objectives. Also, callers may be designated both with respect to their significance and their identification. For example, callers may have different significance in a format, depending on the time or sequence of their call. Also, the designation of a caller may be exceedingly important in relation to the caller eventually being isolated as part of a subset, the members of whom must be accurately verified. As described below, the designations may involve multiple elements which may include: random number assignments, encryption techniques, utilization of calling numbers, identification data, sequence of call and so on to facilitate reliable verification. Note that the communication facility C has a customer billing structure B that is interfaced by the system.

On the qualification and designation of callers, the system enters a data accumulation phase during which digital data (formatted at one of the telephone terminals T1–Tn) is processed by one of the processors PR1–PRn. In general, the processing evolves a subset (at least one caller) the members of which may be verified and confirmed.

Either during the data accumulation phase, or after the processing phase to isolate a subset, a distinct operation may involve actuating the interface terminal T1 for direct local communication between the caller and an operator at the terminal T1. Another distinct operation may involve actuation of the printer PR to provide documents in relation to the operating format, as for providing award certificates as for verifying members of an isolated subset. Also, charge slips may be generated containing at least part of the data of a particular transaction.

An appreciation of the philosophical operation of a system in accordance with the present invention may now be enhanced by considering an exemplary operation of the illustrative embodiment of FIG. 1 to isolate a subset of people who are susceptible to a particular disease or infirmity. The exemplary operation might involve a geographical area, as a large city or population center, in which a particular health problem is somewhat acute. For example, a major population center might be polled where coronary artery disease is a significant problem. Accordingly, persons most susceptible to such disease could be identified for corrective recommendations.

People of the population center could be informed of the availability of a service for statistical health analysis. Accordingly, persons interested in their individual statistical situation would be motivated to utilize the service. Specifically, individual callers would use the remote terminals T1–Tn to contact the central station D through the communication facility C and thereby provide personal information that would enable a statistical analysis in relation to existing data so as to isolate and inform (either real time or batch basis) those persons statistically most likely to be in need of corrective measures. In such applications, it may be important that the caller's identity be subject to reliable verification. Other applications or programs also may present a critical need for positively verifiable identification to the extent that credit card numbers and/or personal identification numbers may be employed.

Figure 3:
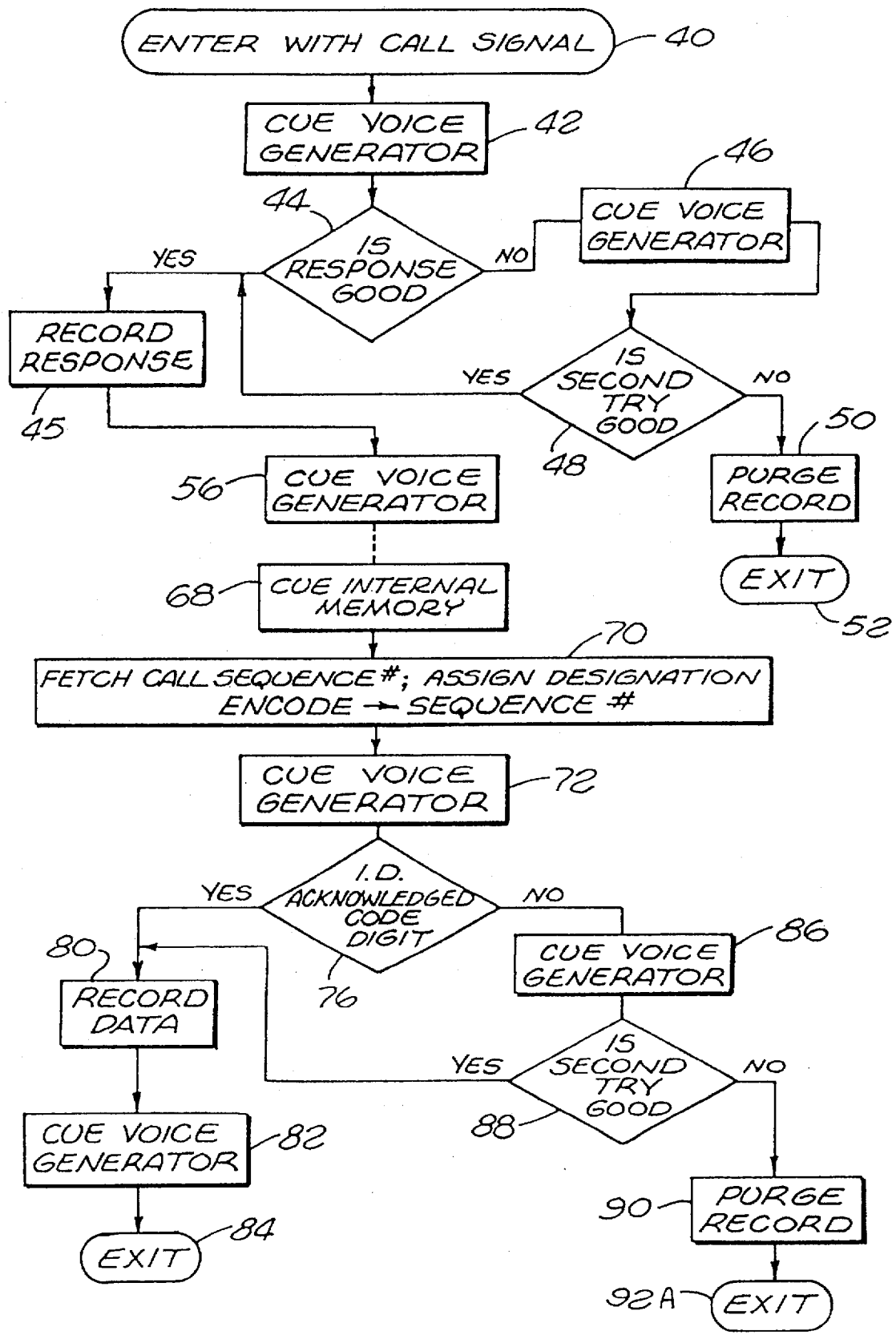
FIG. 3 is a flow diagram of one operating format of the system of FIG. 1.

An exemplary operation of the system, with regard to a specific caller, will now be treated referring somewhat concurrently to FIGS. 1, 2 and 3. As indicated above, FIG. 2 indicates a data storage format for a memory cell in an exemplary processor PR and now will be considered with regard to an operating format in which data is composed for a caller. Pursuing the above example, assume the existence of a caller at the remote terminal T1 (telephone number (213) 627-2222) who wishes to pursue health-related information on the basis of statistical analysis. The caller lifts the hand piece 10 and in accordance with conventional techniques actuates the push buttons 14 to call for a select operating format, e.g. telephone number (213) 627-3333 and thereby establish communication through the facility C with a designated function unit in the central station D. Receiving the call signal, the automatic call distributor AC1 associates the called number ((213) 627-3333, rendered available using standard telephone DNIS techniques) through the interface 20 and the switch 21 to attain connection with the specific processor, e.g. the processor PR1 formatting the health-related program. Accordingly, the processor PR1 cooperates with the interface 20 to cue the interface 20 to operate as a voice generator.

The sequence of operations is represented to be initiated in FIG. 3 by the "enter" block 40 which is accordingly followed by a "cue voice generator" command block 42. If the ANI equipment is not employed, the voice generator in the interface 20 formulates speech, a representative form of which might be: "Thank you for participating in the coronary artery disease statistical analysis. Please give us your telephone number by actuating the call buttons on your telephone instrument."

Acting on the instructions, the caller would push the buttons 14 in sequence to indicate his telephone number, e.g. "(213) 627-2222". Alternatively, the interface 20 can accept the calling number ((213) 627-2222) according to its provision by standard ANI equipment of the communication facility C.

The resulting data signals are communicated from the interface unit 20 (FIG. 1) to the processor PR1 for testing the telephone number as valid or entitled. Essentially, the format of a proper number prompts production of a valid or "good" signal. The test is indicated by the block 44 (FIG. 3). If the response is not valid or entitled, for example contains an inappropriate number of digits or has been used to a point of excess, the operation of block 46 is initiated again cuing the voice generator 30 (FIG. 1). The voice generator accordingly instructs the caller, e.g.: "You have not entered a proper telephone number. Please reenter your telephone number by pressing the appropriate call buttons." The caller is then allotted a predetermined period of time to make a proper entry with the consequence that the system moves to a test operation as indicated by the block 48 (FIG. 3). Specifically, block 48 poses the query: "Is the second try good?"

If the caller is again unsuccessful, the system purges the record as indicated by the block 50 and the call is terminated as indicated by the block 52. In an alternative mode, the processor PR1 may abort the interface and couple the interface terminal IT for direct personal communication with the caller. The interchange would then proceed, person-to-person.

If the caller responds with a proper telephone number, the operation proceeds. Specifically, the system sequences to record the response of the proper telephone number as indicated by the block 45. That is, the caller's telephone number is recorded in an assigned specific memory cell identified with the caller. The format of the cell C1 is indicated in FIG. 2. The first portion, section 53, contains a form of identification data, i.e., the caller's telephone number, i.e. "(213) 627-2222".

Note that as explained above, if the second attempt to formulate a proper number is successful, as manifest by the block 48 (FIG. 3), the response recorded at that stage. In either case, exiting from the block 54 (FIG. 3) invokes the next operation of again queuing the voice generator as indicated by the block 56.

As an alternative format, if a selective-group polling operation is performed, or callers are otherwise to be cleared for entitlement as mentioned above, a caller may be qualified by providing a "one-time" key number. The processor PR1 may incorporate a look-up table for proper, key numbers which numbers may be coded using any of a wide variety of techniques. As a simple illustrative example, the key may comprise a precise number of digits that always total a particular numerical value.

The system proceeds after the caller is qualified. Specifically, the cue to the voice generator of the interface 20 (FIG. 1) as represented by the block 56 produces a request for further information from the caller with further identification data and answer data. For example, the voice generator might request information by stating: "Please use the telephone buttons to indicate initials of your name."

The detailed operation is not represented in FIG. 3 as it is similar to the operation illustrated by the blocks 42 through 54. However, again, a proper response is registered in the storage cell C1 as illustrated in FIG. 2 by the number "53" also registered in the first section 53 of the cell.

The cycle of obtaining digital information from the caller next is repeated with respect to answer data, i.e. specific health data. For example, as illustrated in FIG. 2, the next section 58 in the cell C1 receives an accumulation of health data, including the caller's age, weight, . . . , pulse rate, and so on. Representative digital numbers are illustrated in FIG. 2.

During the course of the telephonic communication, the processor PR1 formulates identification data for the caller specifically including: the chronological sequence of the call, the assigned designation of the call, and a set of acknowledgment digits for the call. Such data identification is registered in the caller's assigned cell C1 in accordance with the format of FIG. 2 being stored in sections 62, 64 and 66. Note that the data may be stored in a coded interrelationship. For example, the acknowledgment digits may be related to the call record sequence. In the illustrative example, the chronological order number of the caller is 4951. The acknowledge digits may be derived from the sequence number. For example, as illustrated, a coded relationship may be established by adding "two" to each of the individual record sequence digits. Considering the example numerically:

Adding without propagated carries:

$$\begin{array}{r} 4951 \\ \underline{2222} \\ 6173 \end{array}$$

Note that the confirmation data as acknowledgement digits can be extremely important, as to communicate with an isolated member of a subset. For example, identification could be published or circulated, as by a television broadcast, then respondents checked by use of confirmation data that may be confidential.

Continuing with the above example, the call chronological sequence registered for the caller is 4951 as represented in the section 62 while the acknowledge digits are 6173 as registered in the section 66. Additionally, the processor PR1 develops an assigned designation number, e.g. designation "4951684", which is registered in the section 64, the acknowledge code or digits, e.g. 6173, being registered in the section 66. These values are formulated in accordance with conventional number techniques during the data acquisition phase. With the exemplary numerals formulated, the operation proceeds.

The processor PR1 (FIG. 1) cues the internal memory. That operation is indicated by the block 68 (FIG. 3). Thus, the processor PR1 fetches the call record sequence number, assigns a designation (if not previously assigned), and encodes the sequence number as the acknowledgment digits (if not previously accomplished). These operations are indicated by the block 70 (FIG. 3).

Next, the processor PR1 (FIG. 1) cues the voice generator in the interface 20, as indicated by the block 72 (FIG. 3) to provide information to the caller. Specifically, for example, the voice generator in the interface 20 (FIG. 1) might signal: "This transaction has been designated by the number 4951684, and is further identified by the acknowledgment digits 6173. Please make a record of these numbers as they will be repeated. Specifically, the designation number is 4951684. The acknowledgment digits are 6173. Please acknowledge this transaction by pressing your telephone buttons to indicate the acknowledge digits 6173." In various applications as those involving security, the order and acknowledgment of callers may be very important. Therefore, data for confirmation associated with the order is important.

The system next proceeds to the test mode as indicated by the block 76 (FIG. 3). If the caller provides the correct acknowledgment digits, the data is confirmed in the record as indicated by the block 80 and is registered in the cell C1 (FIG. 2). Additionally, the voice generator is sequenced as indicated by the block 82 (FIG. 3) to indicate the close of the communication and that the transaction is terminated as represented by the exit block 84.

In the event that a caller cannot confirm his acknowledgment digits, as indicated by the block 76, a repeat operation is performed as indicated respectively by the blocks 86 and 88. Specifically, the voice generator is queued for a second instructional message. In the event that the second attempt also fails, the data is purged and the call discounted as indicated by block 90 and an exit block 92A. If the second try is successful (test block 88), as indicated by the block 80, the record is perfected as indicated above.

As a result of the likelihood of a large number of calls, as described above, data cells in the processors PR1–PRn (FIG. 1) are developed with specific information indicative of a statistical sampling of the populace of concern. The data of that statistical sampling may be self-generating of specific conclusions with respect to a subset of individuals, and/or supplemental data to clearly manifest a significant subset. For example, the data may indicate a significant departure from an assumed normal characteristic. Such data, accumulated from the polling may be considered by logic comparisons in the computer 22 to select the subset of persons who should be isolated.

In addition to the self-generating conclusions available from the received data, the system may involve the introduction of external data. In the physical fitness example, such external data might take the form of national statistical data. In any event, the processing operation usually involves comparison testing which compares caller data from individual memory cells of the processors P1–Pn (FIG. 1) with test data that is supplied through the command terminal CT.

In the above example, members of the public in general were invited to use the service. A number of alternatives exist which might well impact on the statistical analysis. For example, a list may be preserved by a use-rate calculator to implement a consumable key operation. That is, a user is qualified to a specific limited number of uses during a defined interval.

As another example, callers might be restricted to the purchasers of a specific product as a medical apparatus for measuring blood pressures, heart rates, or so on. In such situations, it will be apparent that the statistical data will be somewhat distorted from an average or normal sampling. Clearly, the processors P1–Pn can be programmed to take into account such considerations. In that regard, the processors might also verify identification data proffered by a caller. Such data might take the form of a credit card number or a personal identification number. Methods for verification of such numbers using computer techniques are discussed below.

Figure 4:
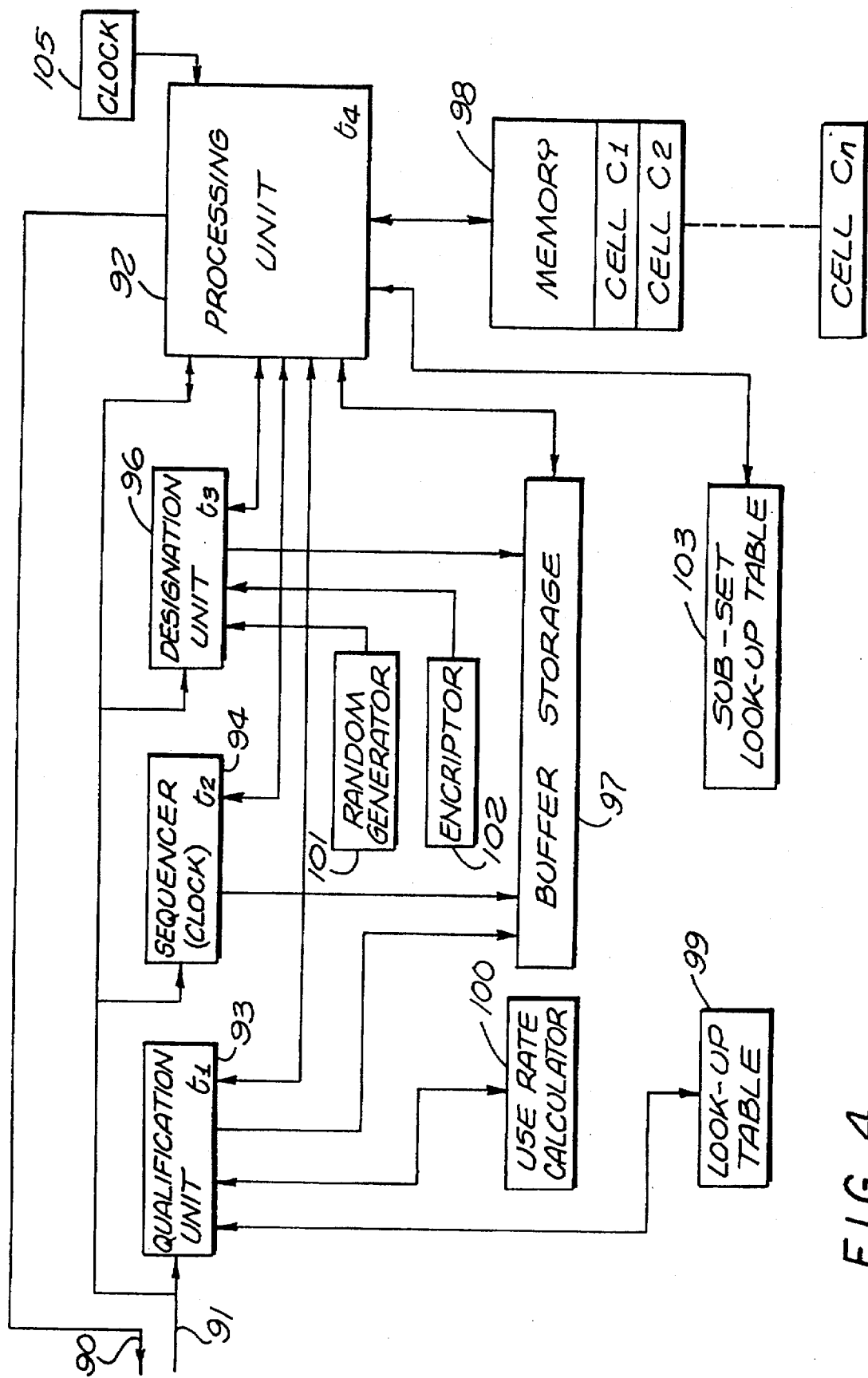
FIG. 4 is a block diagram of a form of processor or function unit as may be employed in the system of FIG. 1.

As indicated above and detailed below, the system can be programmed or formatted for use in a variety of applications. Preliminary to considering exemplary forms of such applications, reference will now be made to FIG. 4 showing an exemplary structural form for the processors PR1–PRn. From the switch 21 (FIG. 1) a pair of communication lines 90 and 91 are indicated in FIG. 4 (top left). The line 90 provides signals from a processing unit 92 while the line 91 provides signals to the processing unit 92 along with other components as represented in FIG. 4. The separate lines 90 and 92 facilitate explanation.

The processing unit 92 may take the form of a minicomputer programmed to accommodate the functions of various applications, as disclosed in detail below. As indicated above, the system may utilize a plurality of independent function units or processing units, e.g., processing unit 92, operating in a somewhat parallel configuration, or alternatively, a limited number of processors may be driven sequentially to accommodate the functional operations as described.

The input line 91 (upper left) is connected specifically to a qualification unit 93, a sequencer 94 and a designation unit 96, as well as the processing unit 92 as indicated above. The qualification unit qualifies access from a remote terminal T1–Tn to the processing unit 92 as described in detail below. In accordance with various applications or operating formats, the qualification unit 93, the sequencer 94 and the designation unit 96 operate preliminarily with respect to individual callers. Generally, these units qualify or test callers for entitlement, develop a sequence-of-calls record and provide forms of designations for callers that may be authenticated. As described in detail below, the units function in sequence to accomplish such operations and accordingly are each individually connected to the processing unit 92 and a buffer storage 97. Essentially, the buffer storage 97 is illustrated separately from the processing unit 92 along with the unit 93, sequencer 94, unit 96, and so on, again in order to facilitate the explanation. Similarly illustrated are a memory 98 (with cells C1–Cn), a look-up table 103 and a clock 105.

Considering the processor of FIG. 4 in further detail, the qualification unit 93 (upper left) is connected to a look-up table 99 and a use-rate calculator 100. The designation unit 96 (top center) is connected to a random number generator 101 and an encryptor 102.

In view of the above structural description of the system, consideration will now be given to certain specific applications in relation to the operation of the system. In that regard, the operation of the system will next be considered to automate a mail-order facility.

Assume that a caller at a terminal T1 (FIG. 1) dials a specific number to identify a mail order interface with the system of FIG. 1. For example, assume the telephone number "(213) 627-4444" for such an interface. Accordingly the caller dials the number at the remote terminal T1. As a result, the communication facility C couples the terminal T1 through the automatic call distributor AC1, the interface 20 and the switch 21 to a select processor PR1 identified and programmed for a mail-order operating format. Note that the communication facility C provides the dialed number ("(213) 627-4444") to the processing system P1 through well known telephonic equipment DNIS. Accordingly, a program is selected to execute the mail order interface.

As a preliminary action, a voice responder in the interface 20 might be cued by the processing unit to identify the mail-order house and indicate that the order will be taken by computer. Either before or after qualification, the caller might be advised that if he prefers to communicate directly with a person, or needs such contact at any point in the communication, he may accomplish it simply by pushing the asterisk button (*) at the terminal T1. Such action forms an abort signal that is detected by the processing unit 92 to transfer the communication to the interface terminal IT (FIG. 1). Alternatively, the customer maybe asked (by voice cue) to provide detailed information as name, address, etc. which is recorded for later processing.

After the preliminary information is supplied to a caller, the qualification phase is initiated. For example, the interface 20 might actuate the terminal T1 to announce: "Please indicate the type of credit card you will use for your purchase by pushing the button number 'one' for Mastercharge, 'two' for . . . . "

The caller's response, indicating a specific credit card, will be stored in a data cell; however, the data is developed initially in the buffer 97. The format and data for the present example (in the buffer 97) will be explained with reference to a storage block format 104 as illustrated in FIG. 5. The first data block 130 accordingly registers a digit to indicate the card that will be used to support the caller's purchase.

Using voice prompt, the interface 20 next instructs the caller to use the telephone buttons to indicate his credit card number and the expiration date of the card. That data is stored in the register 104, specifically in the blocks 132 and 134 as illustrated in FIG. 5.

Next, the caller is asked for his customer number, as it may appear on his catalog. That number is stored in a block 136 of the block format register 104. Note that the caller may not be identified in the files of the mail-order house and in that event, the operation may be shifted to a manual operation to be continued through the interface terminal IT (FIG. 1) as explained above. For a television-initiated mail-order transaction, other numerical codes might be employed as to key into broadcast schedules. For example, a code might be used to indicate program times and thereby enable evaluation of the productivity of such program times. Such operation may be performed during the designation-phase as described below.

To continue with the explanation of the automated format, assume that the customer has a file customer number and that it is stored in the block format register 104 along with his credit card number and expiration date. From that location, the data is checked by the qualification unit 93 (FIG. 4) for propriety as part of the test or qualification phase of operation. The check or test is in two stages and both are performed during an interval designated t1, the qualification unit 93 operating under control of the processing unit 92.

First, the data is verified as representing valid and proper data formats for the customer's number, the credit card number and expiration date. The second operation involves consulting a so-called negative list to assure that the identified card and customer's number have not been cancelled, as for example in the case of credit cards that have been lost or stolen. Detailed structure for such tests is described in the parent case from which this case continues and may be incorporated in the qualification unit 93.

With the successful completion and verification of the preliminary data in the block format register 104, the qualification phase of operation is concluded and the system next interfaces with the caller to acquire and process data for a specific order of merchandise. Note that in the mail-order operating format, the sequence of the call is not normally significant. However, the sequencer 94 may log the time during a period t2 if deemed worthwhile.

Somewhat as described above in relation to the initial operating format (health poll), the voice generator in the interface 20 prompts the caller through a series of exchanges that load the storage block format register 104 with a merchandise order. Thus, as purchase items are confirmed, the register 104 is loaded as exemplified by the blocks 140 and 142. The interchange continues until the customer indicates he does not wish to order any additional items. The system then operates the designation unit 96 (FIG. 4) during the interval t3 to develop and announce the acknowledgement digits as stored in the block 144 (FIG. 5). The acknowledgement digits serve to identify the order both for the caller and the mail-order house. Accordingly, tracing is facilitated. The data (FIG. 5) is then transferred from the buffer 97 (FIG. 4) to a select memory cell C1–Cn.

During the next interval t4, the processing unit 92 (FIG. 4) isolates data of the cells C1–Cn to facilitate the mail-order process. In that regard, the processor 92 may incorporate structure and processing techniques as disclosed in the parent case.

Of the wide variety of other operating formats and applications in accordance herewith, further examples will now be described with reference to the systems of FIGS. 1 and 4. However, from a consideration of the operating formats treated below, it will be apparent that certain structural elements have reoccurring significance in the combination. Specifically, such elements include the structures: (1) utilizing the called number to select a specific operating format, (2) for screening or selecting callers who will be accepted-based on various criteria, (3) for designating callers in a manner to enable subsequent positive identification and (4) various processing aspects of the data manipulations including the provision of at least a portion of certain ID data provided directly from, the telephone apparatus. With respect to the data processing, distinctive elemental features include the utilization of external data not available during the interval of gathering data, the utilization of an interrelationship between the composite data collected during a data acquisition period, and the operation of utilizing time or sequence of callers to accomplish a subset.

As the next illustrative operating format, an instant lottery system will be described. Accordingly, assume the existence of a legalized state lottery accommodated by the telephone system utilizing a pay-to-dial number ("(213) 976-xxxx") and restricted to a limited number of uses for defined intervals of time. For example, a person might be entitled to play the lottery a limited number of times or to the extent of a limited dollar value during a predetermined interval.

From the terminal T1 (FIG. 1) the caller would actuate the push buttons 14 to establish contact with the processing system P1 and coupling would be through the communication facility C, the automatic call distributor AC1, the interface 20 and the switch 21 as described in detail above. The initial operation then involves qualification of the caller to participate in the instant winner lottery. Again, ANI or caller interface techniques may be employed. If the caller is involved, the interface 20 is actuated by the qualification unit 93 during the operating interval t1 to instruct the caller: "Please key in your telephone calling number". As indicated above, an alternative involves the system simply registering the calling number on the basis of its provision by ANI equipment.

In any event, after the caller's telephone number is registered, the instruction is given: "Participation in instant winner lottery is for persons over twenty-one years of age. Accordingly, please key in the year of your birth". A driver's license or credit card number may be similarly registered to confirm age. Alternatively, the combination of telephone number and date of birth could be used. In any event, the caller's data is registered and the qualification unit 93 then functions to test the data as provided. Specifically, the caller's telephone number is checked in a look-up table 99 to determine whether or not it is a proper and currently valid number for use in the lottery. Concurrently, the number is checked by the use-rate calculator to determine the number of times it has been used in excess of a predetermined number of calls or dollar value to participate in the lottery during a current interval of monitoring.

If the data indicates a qualified caller, the system proceeds to the next phase of designating the transaction. Note that the sequence is not significant in this operating format with the consequence that the interval t2 and the operation of the sequencer 94 may be bypassed. Rather, the designation unit 96 operates during the interval t3 to provide the caller with a designation for the current transaction and if applicable, updates the file as to current use or dollar value remaining for the caller's use. As explained above, the random generator 101 with or without the encryptor 102 may be employed to create an identification number which may include an encrypted form of the caller's telephone number. Accordingly, data for the transaction is established in the buffer 97 then set in a cell of the memory 98 (FIG. 4). Specifically, the completed data cell format might be as follows: Telephone No.-Birth Year-Designation-Random No.

The system next functions to generate the random number as indicated above which will then be tested against a series of other numbers to determine whether or not the caller is a winner. In that regard, elements in the processing unit 92 which accomplish the operation are illustrated in FIG. 6 which will now be considered in detail.

A random number generator 160 functions on command to provide a three-digit number. With the consummation of a call, the random number generator 160 is actuated to provide the caller's random number in a selected caller cell 162. From that location, the caller's random number is compared with numbers from a register 164 by a comparator 166. The numbers in the register 164 were previously passed through a gate 174 from the generator 160. In the event of coincidence, the comparator provides an output "yes" signal to a line 168. Conversely, the failure of coincidence prompts the comparator 166 to provide a "no" output to a line 170. Essentially, a "yes" indicates a win while a "no" indicates the caller has lost.

Figure 6:
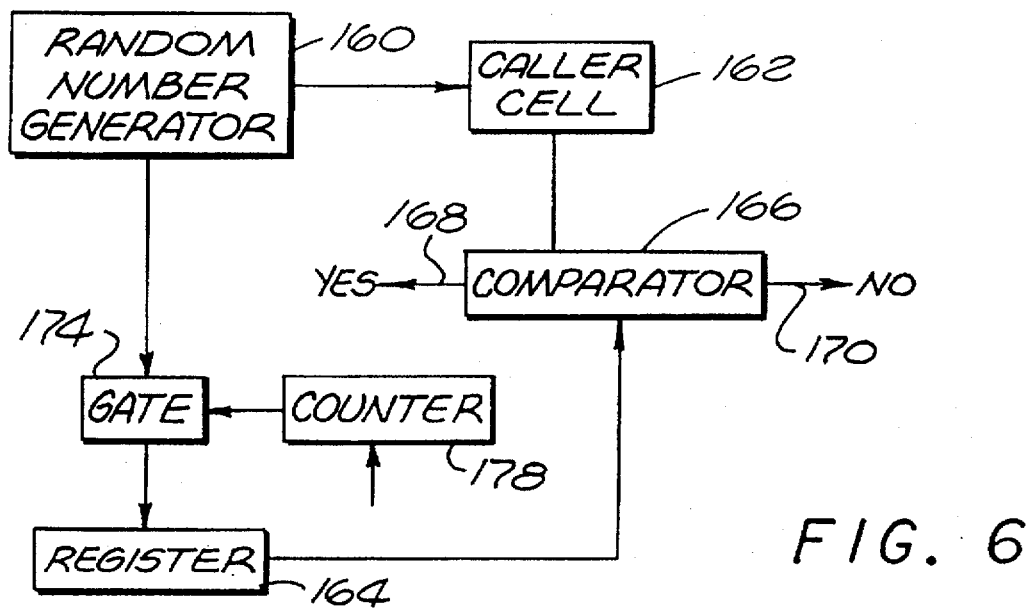
FIG. 6 is a block diagram of elements in an operating function unit of FIG. 4.

The elements of FIG. 6 provide a random operating format to determine winners on a somewhat statistical basis; however, the system increases the probability with the passage of time when no win occurs. In that regard, at the outset of an operating cycle, the random number generator 160 provides a random number that is passed through the gate 174 to the register 164. In the exemplary format, a three-digit number would be provided. At that stage, the caller's random number, from the cell 162, would be compared with the single number in the register 164 by the comparator 166. However, with the passage of time, calls are tallied or time is metered by a counter 178. Accordingly, upon the attainment of a predetermined count, the gate 174 is again qualified to enter another number in the register 164. Accordingly, an increasing set of numbers are held in the register 164 for comparison with each caller's number. Of course, the more numbers in the register 164, the higher probability of a caller winning and that relationship depends upon the duration or number of calls since the last winner.

Either a win or a loss as indicated within the processing unit 92 (FIG. 4) prompts the interface 20 to respond appropriately to the caller announcing his results. If there is a win, the designation may be reinforced and additional identification may be taken as explained above. Of course, if the prize simply involves a credit on the caller's telephone bill or his credit account, identification and designation become less critical considerations.

In the event of substantial awards to be claimed, the processing system P1 (FIG. 1) may actuate the printer PR to produce a positive identification of the winner, which document may be redeemed only by the caller providing the assigned designation along with confirmation of his identification data.

Generally in relation to awards, the processing unit 92 may also utilize a random number format for determining the significance of awards. That is, a random number may be actuated to provide numerals from one through twenty, for example, the magnitude of the number generated for a caller indicating the significance of his award. Normally such information would be provided to the caller and registered in his memory cell.

With respect to memory cells generally, it is to be noted that actuated memory cells may be cleared for callers who are not winners. Accordingly, a limited number of memory cells store the subset of winners for subsequent confirmation processing and so on.

As another operating process format in accordance with the present invention, consider an auction sale. As disclosed herein, the auction format is associated with television as, for example, in the form of a cable channel for dedicated use during an interval of an auction sale.

Preliminarily, in accordance with the disclosed exemplary format, persons wishing to participate in the auction sale would make preliminary arrangements involving utilization of the system to establish authorization data for qualified bidders in cells C1-Cn of the memory 98 (FIG. 4). In an alternative format, the bidders could simply be qualified immediately before bidding, as on the basis of a charge-card number or other identification.

Generally, it is contemplated that callers are coupled into the system only during the bidding on specific items of merchandise. Accordingly, some prequalification may be desirable to facilitate the rapid accumulation of a bidding group with the introduction of a unit of merchandise.

In accordance with the disclosed format, an auctioneer conducts the sale in a somewhat traditional manner, recognizing that he is interfacing a relatively large audience through the system of the present invention and with a television connection. Specifically, the auctioneer is cued as to audience reaction by a monitor incorporated in the command computer terminal CT (FIG. 1). Essentially, the auctioneer is given an abstract or summary of the relative bidding as the auction progresses. In one format, the caller sees the auction on a television receiver. That is, the monitor may be covered by a television camera to inform the audience and particularly interested bidders. Consider the detailed steps of the operation.

As the auctioneer announces the next item for sale, it is televised to potentially interested bidders. In addition to being informed of the merchandise, potential bidders might also be reminded of the telephone number for participating in the auction. Accordingly, any interested person at a remote terminal T1-Tn may dial the auction number and obtain access to the processing systems P1-Pn. The caller would have a television set available, tuned for example to a cable channel.

Any preliminary qualification as indicated above will then be performed along with any appropriate designation. With regard to the designation, unless callers are identified as part of the qualification step, the designation unit 96 (FIG. 4) assigns a limited-digit number to individual callers for use by the auctioneer interfacing the command computer and terminal CT. Further designation and sequencing as disclosed herein also constitute part of the process. To the extent that qualification and designation operations may be performed, the operations are performed as described above with reference to FIG. 4 by the qualification unit 93 and the designation unit 96. Of course, any of the safeguards and limitations as described herein may be employed as deemed appropriate for an auction format.

After the preliminaries, the auctioneer initiates the bidding with respect to a particular item that is observed by the callers on a television receiver as through a cable channel. Note that the audio may be variously-coordinated through the telephone communication facility C and the audio channel of the caller's television. In a simple format, after an introductory phase, communication to callers with respect to the bidding is provided through the television link. Alternatively, the audio unit AD (FIG. 1) may be employed.

Essentially, the auctioneer initiates the bidding by stating an initial value for the opening bid. Callers are invited to bid by actuating the push buttons 14 (FIG. 1). For example, the auctioneer may invite an initial bid of one hundred dollars asking callers to so bid by entering an asterisk (*) by punching the button so designated. In accordance with one operating format, cells in the memory 98 (FIG. 4) are actuated to register the bidding number in identified relationship with several calls. Note that although a record may be desirable, it is not usually necessary to record all bids, particularly at initial bidding figures. In any event, the individual processing units, e.g. unit 92 in individual processors PR1-PRn are interconnected (FIG. 1) and operate to select the final and key bids.

After attaining the initial bid, the auctioneer may invite further bidding by seeking a bid of two hundred dollars or any bid. Such a bid might be accomplished either by punching the asterisk button to attain the solicited bid, or by using number buttons to enter a different bid, e.g. two hundred fifty by buttons "2", "5" and "0". Again, cells of the memory 98 are actuated to record select bids (sequence) at the higher value.

The status of the bidding is presented to the auctioneer by the monitor of the command computer terminal CT (FIG. 1). Specifically, the auctioneer is provided an indication of the number of bidders at each level. If a sizeable number of callers bid at a specific value, the auctioneer may wish to advance the price significantly for the next round of bidding. Thus, the auctioneer proceeds until a small group of remaining callers are addressed. Note that the display of the command terminal CT (FIG. 1) may also inform the auctioneer of fresh bidders.

As the selection process proceeds, signals from the clock CL (FIG. 1) are introduced to indicate the sequence of bidders. For example, assume the bidding has proceeded to a stage where only three bidders remain active. The auctioneer is informed by the command terminal CT of the order in which the callers made their bids. The sequence is also of record in the cells of the memory 78 (FIG. 4) to indicate the sequence in the event that the final bid involves more than one caller. Of course, the first caller to respond with a bid would have priority in the purchase.

Normally at the conclusion of the bidding on a particular item, the contents of the cells in the memory 98 would be purged with only the final bidders being held in general memory within the processing unit 92. Of course, it is important to maintain a record of back-up bidders in the event the sale is not consummated with respect to the first of the highest bidders. That is, a subset of the highest bidders is preserved for each item of merchandise in the event that the highest bidder fails to qualify or the sale otherwise cannot be consummated. Of course, a distinct advantage of the system is the ability to accommodate a vast auction participation group for items of substantial value and as a consequence the distillation of a subset of callers is exceedingly valuable information.

To consider another operating format in association with the television media, a system will now be described whereby television viewers participate on a real-time basis in a game show for prizes. The ability to involve television viewers in a program has the potential of expanding program interest along with the expanded participation.

Game shows in accordance herewith may take any of a wide variety of forms as several well known programs in which studio contestants compete for prizes. In utilizing the system of the present invention to involve remote participants, it may be desirable to preliminarily qualify and designate callers as explained above. Specifically, prior to participating in an actual game show, interested participants interface the system as depicted in FIG. 1, and in the course of an exchange as described above, the qualification unit 93 and the designation unit 96 cooperate with the processing unit 92 to accomplish preliminary data on potential participants in cells of the memory 96.

Various games will involve different screening processes and clearances. For example, a child's television game format may require parental clearance and in that regard written communication may be required for approvals. Such approval may require the assignment of a personal identification number to the child player as qualifying identification data.

As explained above, clearances may be perfected through the look-up table 99 (FIG. 4) in association with the qualification unit 93 or approvals through a consumable key step may be extended to incorporate functions of the processing unit 92 in association with the memory 98. For example, if qualification simply involves a check-off operation, the look-up table 99 will normally be employed. However, in the case of preregistration for a participant, as in the case of the auction sale, the memory 98 is involved with the qualification unit 93 through the processing unit 92 to establish a data cell C1–Cn for each qualified, participant. Thus, each potential participant to be qualified interfaces with the processing unit 92 during a preliminary interval of operation to provide data in one of the cells C1–CN to facilitate qualification for participation during a real-time game show.

At the time of the show, callers are qualified simply by reference to their assigned memory cell data for a verification. Thereafter, the caller's exchange information to supplement their data as with respect to the play which follows. Specifically for example, a caller might select a studio audience participant with whom the caller is to be allied. The interface operation may be essentially as described above wherein a voice generator in the interface 20 (FIG. 1) provides signals which activate the remote telephone unit to speak the instruction: "If you wish to play with Player No. 1, please push button No. 1; if you wish to play with Player No. 2, please push button No. 2 . . . and so on". The caller may also be instructed to indicate the extent of a wager. For example, "Push the number button indicating the points you wish to risk".

The participant data is stored in an assigned cell of the memory 98 (FIG. 4) for the caller and as the game proceeds, the processing unit 92 tallies the caller's score. Scores are interrelated between individual processing units to actuate the terminal CT. Thus, individual accounting occurs for each of the calling participants on an on-line basis dependent upon the success of the studio players and their association with the callers. On-going accounting data may be provided at intervals or real time by the recorded voice to each contestant.

According to the described format, after an interval of play, the processing units, as the unit 92 (FIG. 4), operate to isolate a subset of caller-players who have amassed the highest scores. Of course, various arrangements may be provided for awarding prizes to the select subset of winning callers.

The above format involves a real-time game show with an on-line operating format. A somewhat similar format involves nonreal-time operation and in that sense, callers may interface with the system of the present invention before and after the show; however, not primarily during the show. Such a show might involve a quiz for callers based on their ability to perceive and remember occurrences within the show. Preregistration may be employed, however, is not essential. Rather, callers may call after the broadcast of a program. In that event, sequence or time clocking may be very important to limit or control individual interfaces to a specific time or geographic "window". That is, as suggested above, allocation-routing equipment and techniques may be employed in various of the formats to window callers. With the system, callers are screened or qualified at the time of a call, identified in a particular calling sequence, designated for identification and quiz answers are given for subsequent processing. Alternatively, players could participate by providing their credit card for billing or be billed through the "pay-to-dial" network. Consider an exemplary format.

A key to participation in the game show may involve the purchase of a particular product. For example, a person desiring to participate may purchase a product which carries a concealed key number. The number serves as a caller's key to participation in the game show.

In accordance with the disclosed operating format, after watching the broadcast of a television show (possibly a serial episode) the participant actuates the push buttons 14 at one of the remote terminals T1–Tn to accomplish an interface communication with the select operating format. For example, the caller may actuate the buttons 14 for the station number "277-7777" which identifies the game format of current description.

Assume responsive operation of the communication facility C to couple the caller through the automatic call distributor AC1 to the interface 20. Upon establishing a connection, the interface 20 receives the caller's telephone number through ANI equipment and a data cell in the memory 98 (FIG. 4) is assigned to the caller. Specifically, for example, associative coupling is provided for the caller through the switch 21 (FIG. 1) to the processor PR1 containing the memory 98 (FIG. 4) and a cell C2 assigned to the caller. A block format 200 is illustrated in FIG. 7 indicating the data that is developed in the cell C2. At the outset, the caller's telephone number is stored in a section 201 followed by uses/month in section 202.

Next, the caller is greeted and requested to give the key number entitling him to participate in the game show. The instruction constitutes an initial action to take place in an interval of qualification during the time t1. The caller actuates the buttons 14 providing digital representations to the qualification unit 93 (FIG. 4) and the look-up table 99 is consulted. Note that the table 99 may be a large, shared unit that tabulates each of the key numbers and accounts for their use. If the caller has identified a proper key number, the process proceeds and the key number is accounted, i.e, incremented or decremented to the limit of use if any. Alternatively, a repeat information operation may be requested as described in detail above.

As a further check during the qualification stage, the use-rate calculator 100 may function to determine whether or not an excessive number of calls have originated from the designated number. Thus, consideration involves calls or value with reference to a predetermined period of time. Again, a shared calculator may be used or addressing may obtain selectivity on the basis of calling numbers. If a large number of calls have originated from a single telephone terminal, a fraudulent situation may be suggested. Assuming no such indication occurs, the number of uses is registered in a section 200 (FIG. 7) and the operation proceeds from the interval t1 to interval t2.

During the interval t2, the sequencer 94 registers the precise time of the call in the buffer storage 97, specifically in a section 204 as illustrated in FIG. 7. With the entry of such data, the system passes from the operating interval t2 to t3.

The caller is next asked to identify himself in some specific manner. For example, the caller may simply be asked to provide the year of his birth. Alternatively, somewhat comprehensive information may be taken as in the form of drivers' license numbers, social security numbers and so on. Of course, such data may be employed for subsequent identification of the caller and, accordingly, is registered in the buffer storage 97 (FIG. 4). Specifically, identification information is registered in section 206 of the block 200 as shown in FIG. 7.

In addition to receiving identification information from a caller, the system assigns a designation to the caller. Specifically, the random number generator 101 (FIG. 4) provides a number which may be encrypted along with other identification data as the caller's personal identification to provide a numerical designation that is registered in the storage 97. Specifically, the designation is stored in a section 208 as illustrated in FIG. 7. With the designation operation complete, the interval t3 terminates initiating the data accumulation phase which occurs during an operating interval t4.

At this juncture, operating elements within the processing unit 92 will be considered in relation to an explanation of the manner in which select questions are provided to a caller and his answers received and recorded for subsequent processing to determine winners.

Figure 8:
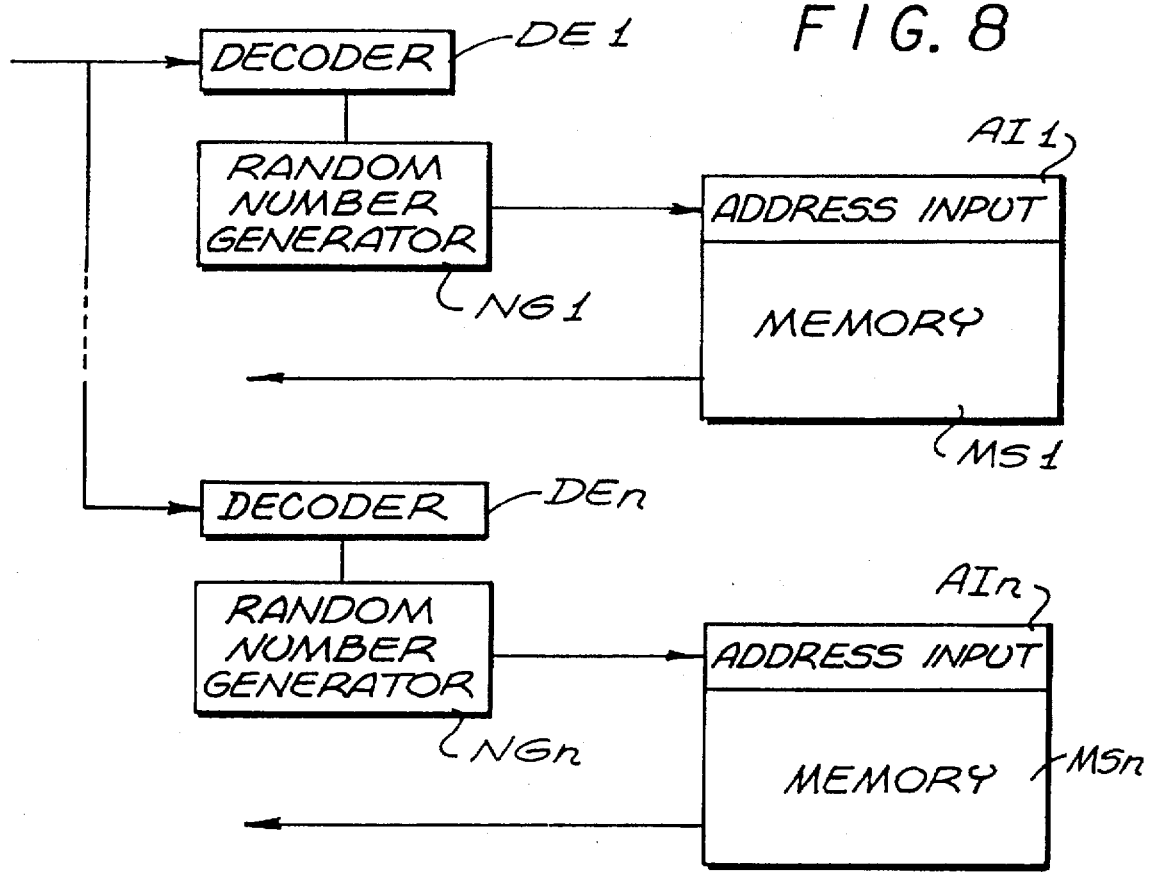
FIG. 8 is a block diagram of elements in an operating function unit of FIG. 4.

Preliminarily, reference will be made to FIG. 8 showing elements involved in the operating format which are contained in the processing unit 92 (FIG. 4) in association with the memory 98. To avoid confusion, the elements identified in FIG. 8 are designated by fresh numerals.

To accommodate the exemplary operating format, a dramatic program might be recorded preparatory to the television broadcast. A substantial number of questions would then be formulated based on the dramatic program. For example, "How many people were present when the will was read?"

It is contemplated that the dramatic program would be broadcast to different geographical segments of the country during different time intervals. To accommodate the different time intervals, it is proposed to utilize different questions for each geographic segment. That is, the basic format can remain the same, only the questions change by time zone to avoid study and collaboration on questions as a result of time shifts. A question propounded to a Chicago caller should not be repeated to a Los Angeles caller. In any event, callers might be given three questions randomly drawn from a pool serving one geographic segment and three questions drawn from a different pool serving another geographic segment.

The signals for prompting a voice generator are registered in memory sections MS1 through MSn. Each of the memory sections MS1–MSn is served by an address input AI1–AIn respectively. Similarly, the address inputs AI1–AIn are instructed by random number generators NG1–NGn, in turn actuated by decoders DE1–DEn. Consider the operating sequence of the memory MS1 as an example.

The decoder DE1 is responsive to telephone calling numbers (provided by ANI equipment) indicative of a particular geographic area. Note, for example, that area code numbers afford an effective geographic classification of callers which is very useful in many formats or processes of statistical analysis in accordance herewith. Note that geographic (or other) classification in accordance herewith is also accomplished by the called numbers provided. Each of several television stations would solicit calls for different numbers as a result, either by DNIS or call channeling. Select processors would be reached through the interface units, e.g. interface 20 FIG. 1. In operation, the decoder DE1 determines a call is from a specific geographic area and accordingly provides a signal to actuate the random number generator NG1. As a consequence, the random number generator NG1 provides a series of three random numbers in the form of addresses for the memory MS1. That is, the addresses may simply comprise three alphanumeric bits supplied to the address input AI1 to prompt the provision of three sets of voice generator signals for announcing the three questions in sequence. For example, the first question might be as suggested above: "Push the button on your telephone for the number of persons present in the room when the will was read".

The voice generator signals are supplied from the memory MS1 (within the processing unit 92, FIG. 4) to the interface 20 (FIG. 1) which generates audio signals to actuate the caller's hand piece 10. Accordingly, the caller is instructed to answer three questions, the responses being recorded in a section 210 of the data block 200 (FIG. 7). Note that the clock 105 (FIG. 4) may be utilized to limit the response period allowed each caller.

As indicated above, to accommodate broadcast of the program in a different time slot for a different geographic area, the decoder DEn (FIG. 8) actuates the random number generator NGn to address the memory MSn to provide three different questions as a result of a random selection. Accordingly, within a time or times (perhaps limited and offset) after the conclusion of the program, a substantial number of callers are accounted for in cells of the memory 98 and similar units of the composite system. The cells indicate sequences of calling and also may contain billing data where appropriate. That is, pay-to-dial operations avoid the need for billing, yet it may still be made of record.

Subsequent to the data accumulation phase of operation, the processing unit 92 (and its equivalents) is actuated during an off-line processing interval to isolate the subset of callers correctly responding to the questions. In accordance with one format, the subset of successful callers may be reduced to a sub-subset as by a random computer "draw" to define a group of significant winners. That is, a random number generator may be employed as explained above.

As an alternative to subsequent processing, the system may inform callers of their success during the course of the interface telephone call. That is, callers might simply be informed by cuing the voice generator: "Your answers are correct and in accordance with the program game, you will now be entered in the sweepstakes draw for the prize . . . ." Thus, the format defines a subset then further selects a sub-subset of winners. In any of the various formats, the status of the analysis can be televised by selecting a camera focused on the interface terminal IT.

Still another operating format for the system takes the form of polling operations to determine opinion or facts. An illustrative form of the format is disclosed below again in association with a television broadcast.

Generally, the illustrative polling format is contemplated in association with a television broadcast addressing a matter of current interest as, for example, a political issue or election. A master of ceremonies propounds questions to a viewing audience, many of whom are on-line through an interface of a system of the present invention. The master of ceremonies or commentator instructs the callers who are regulated and controlled by the system of the present invention to provide digital data which the system processes to inform the commentator as with regard to subsets of callers. For example, the commentator may be statistically informed as to the numbers of callers holding specific views. Consider a specific exemplary operating format.

Assume the existence of a system in accordance with the present invention installed for use in association with a television broadcasting facility. Of course, various previous arrangements could be involved; however, according to one arrangement a commentator simply invites members of the viewing audience to call a specific number and express their views with respect to a specific issue. Callers located at terminals T1–Tn (FIG. 1) activate the terminals to accomplish an interface with one of the processing systems P1–Pn as explained above. Note that the processor (or the interface 20) may involve operation of the qualification unit 93 (FIG. 4) to prevent callers from loading the poll. That is, to prevent multiple calls from a single terminal that would distort a poll, the qualification unit 93 registers calls in association with the use-rate calculator 100. Interfacing a specific processor, callers are screened by the qualification unit 93 (FIG. 4). In such a poll, it may be important to control the sampling group on a statistical basis. For example, it may be desirable to limit callers from each of several geographic areas. Accordingly, by the use of ANI equipment, the caller's telephone number is provided to the qualification unit 93 during the preliminary interval t1, and a determination is performed with regard to the number of involved callers from the geographic area using the look-up table 99. On attaining a full quota from a specific area, a subsequent caller may be informed that the lines are full. Alternatively, the caller may be requested to provide his telephone number for screening in the event ANI equipment is not available.

The caller may be requested to provide additional information so as to poll a balanced group. For example, a caller might be asked questions concerning age, political registration and so on by prompting the interface unit 20 to pose audio questions and testing the digital results through the qualification unit 93 as with reference to the look-up table 99.

As indicated above, in the event that the broadcast television program is one of a series, it may be desirable to limit the extent of participation over a period of several programs. Accordingly, the use-rate calculator 100 (FIG. 4) may be employed in association with the qualification unit 93. That is, if a calling number has participated in a prior poll, it may be denied access for a subsequent poll or its data not counted. Such operation would involve the use-rate calculator 100 in association with the qualification unit 93 performing logic tests to actuate the voice generator of the interface 20 for providing an appropriate interchange with a caller.

With the screening or qualification of a select group of callers, the sequencer 94 (FIG. 4) may or may not be involved to identify the order of callers. Also, the designation unit 96 may or may not be involved in view of the fact that for many polls there is little interest in subsequently identifying callers.

In the poll-format operation of the system, it is important to provide a capability of defining select intervals during which callers may provide data. In one arrangement, with the consummation of a communication interface between a caller and a processor unit, the audio of the television broadcast is keyed from the audio unit AD through the switch 21 (FIG. 1) for communication to the caller.

With a multiplicity of callers in interface relationship with the processors PR1–PRn as function units, a polling question is stated, for example: "If you favor expanded trade with ... at the tone press button one; if you do not, press button two".

To control the interval of polling, the command computer terminal CT (FIG. 1) is actuated to enable the callers timely access to the processors.

At the expiration of a polling interval, the interfaces may be terminated or additional questions may be propounded. In any event, subsequent to the data-gathering phase, the bulk data is supplied to the command computer terminal CT incorporating computing facility to isolate subsets for communication by the broadcast. Accordingly, an effective on-line poll can be conducted with statistical sampling control and prompt display of responses.

As explained above, the arrangement of the function unit (or units) may be variously embodied in a single processor or many processors, depending on various considerations as time sharing, multiplexing, paralleling and so on. The systems as described above embody the components bulked together in one location. However, components of the system could be spaced apart geographically, using dedicated lines or polling techniques. An illustrative embodiment is shown in FIG. 9.

Call distributors CD1–CDn are at different geographic locations along with associated interface units IA1–IAn and IB1–IBn. Each of the interface units, as unit IA1 is coupled to a central processor 251 as indicated by lines 252, 254, 256 and 258. Each of the lines may take the form of a dedicated telephone line or a polling telephonic coupling.

Figure 9:
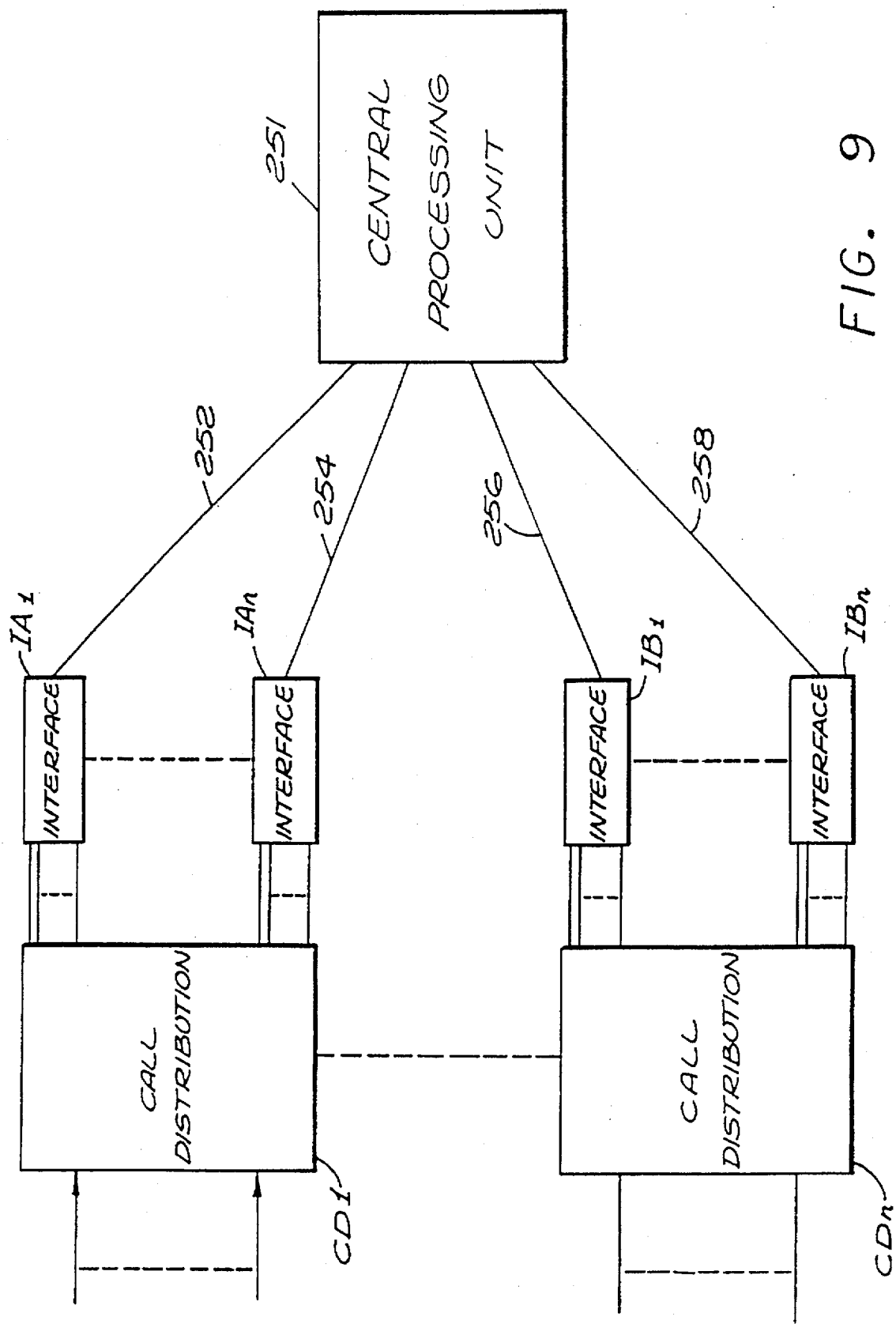
FIG. 9 is block diagram illustrating components of the system as spaced apart geographically.

In the operation of the system of FIG. 9, the call distributors CD are coupled to a telephonic communication system and accordingly allow the interface units I to provide interface communication between the central processing unit 251 and a multitude of remote terminals T1–Tn as illustrated in FIG. 1. With data accumulated in the cells, it may be variously down loaded as to a central processing station. Thus, the distributed-component system is capable of executing the various formats as explained above with reference to the illustrative structure.

In view of the above explanation of exemplary systems, it will be appreciated that other embodiments of the present invention may be employed in many applications to accumulate statistical data, process such data, and define subsets of callers of concern. While certain exemplary operations have been stated herein, and certain detailed structures have been disclosed, the appropriate scope hereof is deemed to be in accordance with the claims as set forth below.

What is claimed is:

1. A process for controlling operations of an interface with a communication facility, said process including the steps of:

providing products carrying participation numbers specifying limits on use to entitle individual callers to access said operations of said interface with said communication facility;

coupling remote terminals to said interface for providing voice signals to said individual callers as to provide vocal operating instructions to said individual callers;

receiving digital identification data from said individual callers responsive to said voice signals including said participation numbers for said individual callers and answer data provided from said remote terminals under control of said individual callers;

qualifying said individual callers by testing to determine if said individual callers are entitled to access said operations of the interface based on said limits on use specified by said participation numbers for said individual callers and accordingly providing approval signals for qualified individual callers;

accessing a memory with said participation numbers for said individual callers and storing data relating to calls from said individual callers; and processing at least certain of said answer data responsive to said approval signals to isolate a subset of said individual callers.

2. A process according to claim 1, wherein a limit on use with respect to each of said individual callers specifies a predetermined number of uses.

3. A process according to claim 1, wherein a limit on use with respect to each of said individual callers specifies a predetermined dollar amount.

4. A process according to claim 1, wherein said communication facility automatically provides called terminal digital data (DNIS) to identify a specific format from a plurality of formats for executing operations of said interface.

5. A process according to claim 4, wherein said communication facility also automatically provides calling terminal digital data to identify said remote terminals.

6. A process according to claim 5, wherein said calling terminal digital data is stored in said memory.

7. A process according to claim 6, wherein said calling terminal digital data is tested to control access to said operations of the interface.

8. An analysis control system for use with a communication facility including remote terminals for individual callers, wherein said remote terminals may comprise a conventional telephone instrument including voice communication means, and digital input means in the form of an array of alphabetic numeric buttons for providing data, said analysis control system comprising:

an interface structure coupled to said communication facility to interface said remote terminals for voice and digital communication, and including means to provide caller data signals representative of data relating to said individual callers developed by said remote terminals and means to receive calling terminal digital data automatically provided by said communication facility;

voice generator structure coupled through said interface structure for actuating said remote terminals as to provide vocal operating instructions to said individual callers;

record structure, including memory and control means, said record structure connected to receive said caller data signals from said interface structure for accessing a file and storing digital data relating to said individual callers provided from said digital input means through said interface structure to store designations of said individual callers including representations indicative of a calling order sequence of said individual callers, said record structure also including a database of stored calling terminal digital data; and qualification structure controlled by said record structure for restricting the extent of access to said system by said individual callers based on a comparison of said calling terminal digital data against said database of stored calling terminal digital data.

9. An analysis control system according to claim 8, wherein said individual callers provide personal identification number data as caller data signals.

10. An analysis control system according to claim 8, wherein said calling order sequence is indicative of caller transaction data.

11. An analysis control system for use with a communication facility including remote terminals for individual callers, wherein each of said remote terminals may comprise a conventional telephone instrument including voice communication means, and digital input means in the form of an array of alphabetic numeric buttons for providing data, said analysis control system comprising:

an interface structure coupled to said communication facility to interface each of said remote terminals for voice and digital communication, and including means to provide caller data signals representative of data relating to said individual callers developed by said remote terminals and including means to automatically receive calling terminal digital data from said communication facility;

voice generator structure coupled through said interface structure for actuating each of said remote terminals as to provide vocal operating instructions to each of said individual callers;

record structure, including memory and control means, said record structure connected to receive said caller data signals from said interface structure for accessing a file; and designation structure coupled to said interface structure and said record structure for developing individual designations for at least certain of said individual callers, indicative of caller significance in order to isolate a subset of said individual callers at calling remote terminals.

12. An analysis system for use with a communication facility including remote terminal apparatus for individual callers, wherein said remote terminal apparatus may comprise a conventional telephone instrument including voice communication means, and digital input means in the form of an array of alphabetic numeric buttons for providing caller data including answer data, said analysis system comprising:

interface means selectively coupled to said communication facility to interface said remote terminal apparatus for voice and digital communication and including means to provide signals values from data developed by said remote terminal apparatus;

voice generator means selectively coupled through said interface means to said remote terminal apparatus for providing vocal operating instructions to said individual callers;

designation means selectively coupled to said interface means for assigning individual designations to said individual callers; and processing means for processing at least certain of said answer data, and storage means for registering said answer data, said processing means for isolating a subset of said individual callers based on repeated comparisons of said answer data that is registered against said answer data being provided by said individual callers including data associated with said individual callers.

13. An analysis control system according to claim 12, wherein said designation means includes means for storing sequence data indicative of a calling sequence of said individual callers.

14. An analysis control system according to claim 12, wherein said voice generator means is driven to prompt certain select ones of said individual callers to provide telephone number data for storage.

15. An analysis control system according to claim 12, wherein said processing means processes said answer data that is registered in combination with said answer data being provided by said individual callers.

16. An analysis control system according to claim 12, further comprising:

transfer means for transferring certain of calls from said individual callers to a terminal attended by an operator.

17. An analysis control system according to claim 16, wherein said operator enters at least certain of said answer data for said certain of said individual callers.

18. An analysis control system according to claim 12, wherein said storage means stores caller provided digital data and voice data.

19. An analysis control system according to claim 12, wherein said answer data includes caller personal identifying data.

20. An analysis control system according to claim 19, wherein said repeated comparisons include processing of multiple personal identifying data including caller age data.

21. An analysis control system for use with a communication facility including remote terminals for individual callers, wherein each of said remote terminals may comprise a conventional telephone instrument including voice communication means and digital input means in the form of an array of alphabetic numeric buttons for providing data, said analysis control system comprising:

interface structure coupled to said communication facility to interface said remote terminals for voice and digital communication and including means to provide signals representative of data developed by said remote terminals and including means to automatically receive called number identification signals (DNIS) to identify one of a plurality of different called numbers;

voice generator structure coupled through said interface structure for actuating said remote terminals as to provide vocal operating instructions to specific ones of said individual callers;

record means, including memory and control means, said record structure connected to said interface structure for accessing a file and storing data relating to said individual callers;

designation means coupled to said interface structure and said record means for assigning individual designations to said individual callers and storing said designations in said record means as part of said data relating to said individual callers; and encoding means coupled to said record means and said designation means for encoding at least certain of said data relating to said individual callers.

22. An analysis control system according to claim 21, wherein said designation means includes means for storing representations of other data provided by a caller including caller PIN number data.

23. An analysis control system according to claim 22, wherein said other data further includes caller credit card data.

24. An analysis control system according to claim 23, wherein said other data further includes credit card expiration data.

25. An analysis control system according to claim 23, wherein said caller credit card data is verified to approve said caller.

26. An analysis control system according to claim 21, wherein said record means includes means for storing customer number data which is tested to determine if said customer number data indicates negative or canceled status.

27. An analysis control system for use with a communication facility including remote terminals for individual callers, wherein said remote terminals may comprise a conventional telephone instrument including voice communication means, and digital input means in the form of an array of alphabetic numeric buttons for providing data, said analysis control system comprising:

interface structure coupled to said communication facility to interface said remote terminals for voice and digital communication, and including means to provide caller data signals representative of data relating to said individual callers developed by said remote terminals and including means to receive called number identification signals (DNIS) automatically provided by said communication facility to identify a select one of a plurality of different called numbers associated with a select format of a plurality of different formats;

record structure, including memory and control means, said record structure connected to receive said caller data signals from said interface structure for accessing a file and storing certain of said data developed by said remote terminals relating to certain select ones of said individual callers;

qualification structure coupled to said record structure for qualifying access by said individual callers to said select format based on at least two forms of distinct identification including caller customer number data and at least one other distinct identification data element consisting of personal identification data provided by a respective one of said individual callers; and switching structure coupled to said interface structure for switching certain select ones of said individual callers at said remote terminals to any one of a plurality of live operators wherein said live operators can enter at least a portion of said caller data relating to said select ones of said individual callers through interface terminals, which is stored in said record structure.

28. An analysis control system according to claim 27, wherein said caller data signals include signals indicative of caller credit card number data provided by said individual callers.

29. An analysis control system according to claim 28, wherein said caller data signals further include signals indicative of credit card expiration date data.

30. An analysis control system according to claim 28, wherein said caller credit card number data is verified on-line.

31. An analysis control system according to claim 27, wherein said caller customer number data is tested to determine if caller status is unacceptable or cancelled.

32. An analysis control system according to claim 27, wherein said qualification structure qualifies said individual callers to provide access to at least a portion of said system.

33. An analysis control system according to claim 27, wherein said personal identification data is PIN number data.

34. An analysis control system according to claim 27, wherein at least one distinct identification is provided by said individual callers on-line and is stored in said record structure for subsequent use.

35. An analysis control system according to claim 32, wherein said access to at least a portion of said system is provided based upon a computer generated number identifying a previous transaction, said computer generated number indicative of caller transaction order data.

36. An analysis control system according to claim 27, wherein said caller customer number data is calling number identification data automatically provided by said communication facility.

37. An analysis control system according to claim 27, wherein said qualification structure is further controlled by said record structure for testing at least certain of said caller data signals provided by said respective one of said individual callers to specify a consumable participation key for said respective one of said individual callers.

38. An analysis control system according to claim 37, wherein said consumable participation key is comprised of said at least two forms of distinct identification.

39. An analysis control system according to claim 27, wherein at least one of said at least two forms of distinct identification includes social security number data.

40. An analysis control system according to claim 27, wherein at least one of said at least two forms of distinct identification includes caller PIN number data.

41. An analysis control system according to claim 27, wherein at least one other distinct identification data comprises initials data.

42. An analysis control system according to claim 27, wherein said called number identification signals (DNIS) are received by one of a plurality of call distributors.

43. An analysis control system according to claim 42, wherein said plurality of call distributors are at different geographic locations.

44. An analysis control system according to claim 42, wherein said plurality of call distributors are accessed under control of call allocation routing capability of said communication facility.

45. A system according to claim 27, wherein said select format is one form of an order format.

46. A system according to claim 45, wherein said select order format is one form of a television initiated mail order operation.

47. A system according to claim 46, wherein said one form of said television initiated mail order operation further receives and stores at least a portion of calling number identification signals automatically provided by said communication facility.

48. An analysis control system according to claim 27, wherein an additional form of distinct identification is provided by said individual callers on-line and is stored for subsequent use.

49. An analysis control system according to claim 27, wherein said caller customer number is verified against a record of qualified customer numbers and said personal identification data is provided on-line by said individual callers and stored in said record structure for subsequent use.

50. A system according to claim 27, wherein said qualification structure further executes a test for unacceptable customer numbers based upon data developed by said remote terminals indicative of said caller customer numbers.

51. An analysis control system according to claim 27, further comprising:
means for providing computer generated number data indicative of sequence data to said individual callers.

52. An analysis control system according to claim 51, wherein said sequence data indicates caller transaction order data.

53. An analysis control system according to claim 51, wherein said personal identification data comprises caller social security number data.

54. An analysis control system according to claim 51, wherein said personal identification data comprises a PIN number.

55. An analysis control system according to claim 51, wherein said personal identification data comprises caller telephone number data.

56. An analysis control system according to claim 27, wherein said select format is identified by said one of said plurality of different called numbers and is a distinct operating process merchandising format for processing of a customer's interactive order.

57. An analysis control system according to claim 56, wherein said qualification structure tests credit for said individual caller.

58. An analysis control system according to claim 57, wherein said qualification structure testing for credit tests said caller customer number data for unacceptable or cancelled credit status.

59. An analysis control system according to claim 58, wherein said qualification structure testing for credit further test by scoring the instant transaction for credit approval.

60. An analysis control system according to claim 56, whereby said individual callers enter data indicative of the item for order.

61. An analysis control system according to claim 60, further comprising:

means for providing computer generated number data indicative of sequence data to said individual callers wherein said sequence data indicates caller transaction order data.

62. An analysis control system according to claim 61, wherein said personal identification data comprises social security number data.

63. An analysis control system according to claim 61, wherein said personal identification data comprises a PIN number.

64. An analysis control system according to claim 63, wherein said personal identification data element is provided on-line for said individual callers and is stored in said record structure for subsequent use.

65. An analysis control system for use with a communication facility including remote terminals for individual callers, wherein each of said remote terminals may comprise a conventional telephone instrument including voice communication means, and digital input means in the form of an array of alphabetic numeric buttons for providing data, said analysis control system comprising:

an interface structure coupled to said communication facility to interface said remote terminals for voice and digital communication, and including means to provide caller data signals representative of data relating to said individual callers developed by said remote terminals and including means to automatically receive called number identification signals (DNIS) to identify a select format from a plurality of formats;

voice generator structure coupled through said interface structure for actuating said remote terminals as to provide voice operating instructions to said individual callers;

record structure, including memory and control means, said record structure connected to receive said caller data signals from said interface structure for accessing a file and storing digital caller data relating to said individual callers provided from said digital input means through said interface structure; and qualification structure for testing caller data signals provided by at least one of said individual callers to specify a consumable participation key, said consumable participation key for use during a single predetermined period of time for restricting the extent of access to at least a portion of said system by said one of said individual callers on the basis of entitlement.

66. An analysis control system according to claim 65, wherein said caller data signals represent a plurality of data elements for identifying a caller or a caller transaction or both.

67. An analysis control system according to claim 66, wherein said consumable participation key is comprised of at least two forms of distinct identification.

68. A process for controlling operations of the interface with a telephonic communication system including remote terminals for individual callers, wherein each of said remote terminals may comprise a conventional telephone instrument including voice communication means and digital input means in the form of an array of alphabetic numeric buttons for providing data and wherein said telephonic communication system has a capability to automatically provide call data signals, indicative of calling number identification data or called number identification data (DNIS) or both, said process including the steps of:

providing products carrying concealed participation numbers specifying limits on use to entitle individual callers to access said operations of the interface with said telephonic communication system;

receiving said call data signals indicative of called number identification data including a called number (DNIS) dialed by a respective one of said individual callers to select a specific operating format from a plurality of operating formats of said operations of the interface;

coupling said remote terminals to said interface for providing voice signals to said individual callers and generating said voice signals for actuating said remote terminals as to provide vocal operating instructions to specific ones of said individual callers;

receiving digital identification data from said individual callers responsive to said voice signals including said participation numbers for said individual callers and answer data developed by said remote terminals under control of said individual callers;

qualifying said individual callers by testing to determine if said individual callers are entitled to access said operations of the interface based on said limits on use specified by said participation numbers for said individual callers and accordingly approving qualified individual callers;

conditionally accessing a memory with said participation numbers and storing data relating to calls from said individual callers;

processing at least certain of said answer data responsive to approving said qualified individual callers; and providing on-going accounting data to said individual callers at intervals during calls from said individual callers.

69. A process according to claim 68, further including the step of:

updating said limits on use on-line.

70. A process according to claim 68, wherein said qualifying step further limits access by said individual callers to a predetermined period of time on the basis of entitlement.

71. A process according to claim 68, wherein said processing step further includes:

processing at least certain of said answer data provided to questions with respect to a poll.

72. A process according to claim 71, wherein said specific operating format is an automated promotional format associated with said specific operating format.

73. A process according to claim 72, wherein said participation numbers are provided in the packaging of said products.

74. A process according to claim 73, wherein said participation numbers are associated with an automated promotion of said products.

75. A process according to claim 74, wherein said participation numbers are concealed within said products.

76. A process according to claim 68, further comprising the step of:
allocating calls from said individual callers through said communication facility to window callers.

77. A process according to claim 68, further comprising the step of:
receiving said call data signals indicative of calling number identification data with respect to all or nearly all of said individual callers.

78. A process according to claim 77, wherein at least a part of said calling number identification data is utilized in said processing step to test for excess use with respect to said specific operating format.

79. A process for controlling operations of an interface with a telephonic communication system including remote terminals for individual callers, wherein each of said remote terminals may comprise a conventional telephone instrument including voice communication means and digital input means in the form of an array of alphabetic numeric buttons for providing data and wherein said telephonic communication system has a capability to automatically provide call data signals indicative of calling number identification data or called number identification data (DNIS) or both, said process including the steps of:
providing products carrying concealed participation numbers specifying limits on use to entitle said individual callers to access said operations of the interface with said telephonic communication system;
receiving said call data signals indicative of called number identification data including a called number (DNIS) dialed by individual callers to select a specific operating format from a plurality of operating formats of said operations of the interface;
coupling remote terminals to said interface for providing voice signals to said individual callers and generating said voice signals for actuating said remote terminals as to provide vocal operating instructions to specific ones of said individual callers;
receiving digital identification data from said individual callers responsive to said voice signals including said participation numbers and answer data provided from said remote terminals under control of said individual callers;
qualifying said individual callers by testing to determine if said individual callers are entitled to access said operations of the interface based on said limits on use specified by said participation numbers and accordingly approving qualified individual callers;
conditionally aborting interaction during said operations of the interface with an individual caller at an remote terminal and coupling said remote terminal to an interface terminal under predetermined conditions for direct personal communication;
accessing a memory with said participation numbers and storing data relating to calls from said individual callers; and
processing at least certain of said answer data responsive to approving said qualified individual callers.

80. A process according to claim 79, further comprising the step of:
providing on-going accounting data to said individual callers at intervals during calls from said individual callers.

81. A process according to claim 79, further including the step of:
updating said limits on use on-line.

82. A process according to claim 79, wherein said step of receiving said call data signals includes receiving said called number identification data to identify one form of an automated promotional format associated with said products as said specific operating format.

83. A process according to claim 79, wherein said step of qualifying based upon said limits on use takes place on-line.

84. A process according to claim 79, wherein said processing step further includes:
processing at least certain of said answer data provided to questions with respect to a poll.

85. A process according to claim 79, wherein said participation numbers are provided in the packaging of said products.

86. A process according to claim 85, wherein said participation numbers are associated with an automated promotion of said products.

87. A process for controlling operations of the interface with a telephone communication system, said process including the steps of:
providing products carrying participation numbers concealed within the packaging of said products, said participation numbers specifying limits on use to entitle individual callers to access said operations of the interface with said telephone communication system;
coupling remote terminals to said interface for providing voice signals to said individual callers and generating said voice signals for actuating said remote terminals as to provide vocal operating instructions to specific ones of said individual callers;
receiving digital identification data from said individual callers responsive to said voice signals including said participation numbers for said individual callers and answer data provided from said remote terminals under control of said individual callers;
qualifying said individual callers by testing to determine if said individual callers are entitled to access said operations of the interface based on said limits on use specified by said participation numbers for said individual callers and accordingly approving qualified individual callers;
accessing a memory with said participation numbers for said individual callers and storing data relating to calls from said individual callers;
processing at least certain of said answer data responsive to approving said qualified individual callers; and
receiving calling number identification signals from said telephone communication system for said individual callers and utilizing at least part of said calling number identification signals in said processing step.

88. A process according to claim 87, further including the step of:
updating said limits on use on-line.

89. A process according to claim 87, wherein said process is for automating a promotion.

90. A process according to claim 87, wherein said step of qualifying further restricts the extent of access during a predetermined period of time to at least a portion of said system on the basis of entitlement.

91. A process according to claim 87, wherein said processing step further includes:

processing at least certain of said answer data provided to questions with respect to a poll.

92. An process according to claim 87, wherein said participation numbers are associated with an automated promotion of said products.

93. An analysis control system for use with a communication facility including remote terminals for individual callers, wherein each of said remote terminals may comprise a conventional telephone instrument including voice communication means and digital input means in the form of an array of alphabetic numeric buttons for providing data and wherein said communication facility has a capability to provide call data signals indicative of calling number identification data and called number identification data for at least certain of said individual callers, said analysis control system comprising:

interface structure coupled to said communication facility to interface each of said remote terminals for voice and digital communication, and including means to provide signals representative of data developed by said remote terminals and for receiving said calling number identification data and said called number identification data (DNIS) to identify one from a plurality of called numbers;

voice generator structure coupled through said interface structure for actuating said remote terminals as to provide vocal operating instructions to said individual callers;

record structure, including memory and control means, said record structure connected to said interface structure for accessing a file and storing data relating to certain select ones of said individual callers in accordance with said calling number identification data;

qualification structure controlled by said record structure for controlling access to said system by said individual callers; and means for processing at least certain of said data developed by said remote terminals relating to certain select ones of said individual callers.

94. An analysis control system according to claim 93, further comprising:

a plurality of call distributors located at different geographic locations wherein called number identification signals (DNIS) to identify said plurality of called numbers are received at said interface structure through said plurality of call distributors and wherein said communication facility further comprises:

call allocation routing capability to window said individual callers.

95. An analysis control system according to claim 94, wherein said one from a plurality of called numbers corresponds to a select one of a plurality of formats.

96. An analysis control system for use with a communication facility including remote terminals for individual callers, wherein each of said remote terminals may comprise a conventional telephone instrument including voice communication means, and digital input means in the form of an array of alphabetic numeric buttons for providing data, said analysis control system comprising:

an interface structure coupled to said communication facility to interface said remote terminals for voice and digital communication, and including means to receive answer data signals provided by said individual callers from said remote terminals wherein said communication facility automatically provides called number identification data signals indicating a called number (DNIS) dialed by an individual caller and said called number is one of a plurality of called numbers;

voice generator structure coupled through said interface structure for actuating said remote terminals as to provide vocal operating instructions to said individual callers;

record structure including memory and control means for storing answer data signals and for receiving identification data signals for specific of said individual callers, said record structure further including means for receiving additional identification data signals on-line for said specific of said individual callers and for storing said additional identification data signals in said record structure for subsequent identification of said individual callers;

means for processing at least certain of said answer data signals relating to select ones of said individual callers; and qualification structure for verifying said identification data signals for specific of said individual callers against a file of stored identification data.

97. An analysis control system according to claim 96, wherein calling number identification signals automatically provided by said communication facility are received and processed by said system.

98. An analysis control system according to claim 96, wherein said identification data signals comprise caller customer number data.

99. An analysis control system according to claim 98, wherein said additional identification data signals comprise at least one of caller PIN number data, caller initials data, social security number data, or caller telephone number data.

100. An analysis control system according to claim 98, wherein calling number identification data automatically provided by said communication facility is indicative of said caller customer number data.

101. An analysis control system, according to claim 96, wherein said identification data signals include data indicative of caller customer number data and said additional data signals are indicative of caller social security number data.

102. An analysis control system, according to claim 100, wherein said additional identification data signals are indicative of caller PIN number data.

103. An analysis control system according to claim 101, further comprising:

a plurality of call distributors located at different geographic locations wherein called number identification signals (DNIS) to indicate said plurality of said called numbers are received at said interface structure through said plurality of call distributors and wherein said communication facility further comprises:

call allocation routing capability to window said individual callers.

104. An analysis control system according to claim 96, further comprising:

means for providing computer generated number data indicative of caller transaction sequence data and storing said computer generated number data in said record structure.

105. An analysis control system according to claim 104, wherein said computer generated number data is provided in a chronological order to said individual callers during a data acquisition phase.

106. An analysis control system according to claim 96, wherein said one of a plurality of called numbers identifies one of a plurality of distinct operating formats.

107. An analysis control system according to claim 106, further comprising:
qualification structure to test said individual callers on the basis of limits specified on use.

108. An analysis control system according to claim 106, wherein a select one of said plurality of distinct operating formats is an automated ordering format.

109. An analysis control system for use with a communication facility including remote terminals for individual callers, wherein each of said remote terminals may comprise a conventional telephone instrument including voice communication means and digital input means in the form of an array of alphabetic numeric buttons for providing data, said analysis control system comprising:
interface structure coupled to said communication facility to interface said remote terminals for voice and digital communication and including means to provide signals representative of data developed by said remote terminals;
voice generator structure selectively coupled through said interface structure to said remote terminals for providing vocal operating instructions to individual ones of said individual callers;
record memory connected to said interface structure for accessing a file and storing data relating to certain select ones of said individual callers including voice data and digital data developed by said remote terminals;
qualification structure for qualifying said individual callers by testing to determine if at least certain of said individual callers are entitled to access a processing format of said analysis control system;
structure selectively coupled to said interface structure and said record memory for providing computer generated numbers to said individual callers and storing said computer generated numbers in said record memory; and
analysis structure connected to said record memory for processing at least certain of said data relating to certain select ones of said individual callers; and
means to control processing formats of said analysis control system in accordance with signals automatically provided by said communication facility indicative of a respective one of a plurality of called numbers (DNIS) for a respective one of said processing formats.

110. An analysis control system according to claim 109, wherein said signals representative of data include credit card or participation number data.

111. An analysis control system according to claim 110, wherein said credit card or participation number data is verified.

112. An analysis control system according to claim 109, wherein one of said plurality of called numbers (DNIS) is a pay to dial number.

113. An analysis control system according to claim 109, wherein one form of a select processing format polls certain individual callers for personal information data.

114. An analysis control system according to claim 113, wherein said personal information data includes physical characteristic data.

115. An analysis control system according to claim 113, wherein said personal information data includes age data.

116. An analysis control system for use with a communication facility including remote terminals for individual callers, wherein each of said remote terminals may comprise a conventional telephone instrument including voice communication means and digital input means in the form of an array of alphabetic numeric buttons for providing data and wherein said communication facility has a capability to provide called number identification data (DNIS) and calling number identification data, said analysis control system comprising:
multiple automatic call distributors at geographically distinct locations for receiving calls from said individual callers at said remote terminals;
interface structure coupled to said communication facility to interface said remote terminals for voice and digital communication and including means to receive caller data signals representative of data relating to said individual callers, including caller personal identification data and said called number identification data signals (DNIS) and said calling number identification data provided automatically by said communication facility, said called number identification data signals (DNIS) identifying a select format from a plurality of formats;
voice generator structure coupled through said interface structure for actuating said remote terminals as to provide vocal operating instructions in accordance with said select format to said individual callers and to prompt said individual callers to enter data;
record testing structure connected to receive and test said caller data signals including said calling number identification data and said caller personal identification data against previously stored calling number identification data and caller personal identification data; and
analysis structure for receiving and processing said caller data signals under control of said record testing structure.

117. An analysis control system according to claim 116, wherein said communication facility further comprises:
call allocation routing capability to window said individual callers.

118. A process for controlling operations of an interface with a telephonic communication system including remote terminals for individual callers, wherein each of said remote terminals may comprise a conventional telephone instrument including voice communication means and digital input means in the form of an array of alphabetic numeric buttons for providing data and wherein said telephonic communication system has a capability to automatically provide call data signals indicative of calling number identification data or called number identification data (DNIS) or both, said process including the steps of:
providing products carrying participation numbers concealed within said products specifying limits on use relating to a dollar amount to entitle said individual callers to access said operations of said interface with said telephonic communication system;
receiving said call data signals indicative of called number identification data including a called number (DNIS) dialed by said individual callers to select a specific operating format from a plurality of operating formats of said operations of said interface wherein at least one of said plurality of operating formats includes an automated promotional format for promoting said products;
coupling said remote terminals to said interface for providing voice signals to said individual callers and generating said voice signals for actuating said remote terminals as to provide vocal operating instructions to specific ones of said individual callers;

receiving digital identification data from said individual callers responsive to said voice signals including said participation numbers and answer data provided from said remote terminals under control of said individual callers;

qualifying said individual callers by testing to determine if said individual callers are entitled to access said operations of said interface based on said limits on use specified by said participation numbers and accordingly approving qualified individual callers;

accessing a memory with said participation numbers and storing data relating to calls from said individual callers;

processing at least certain of said answer data responsive to approving said qualified individual callers; and providing on-going accounting data to said individual callers, said on-going accounting data for at least one of a plurality of intervals being determined at least in part by said answer data provided by an individual caller during a call and during at least one of said intervals includes real time data provided to said individual caller on-line.

119. A process according to claim 118, further including a step of aborting interaction between said telephonic communication system and said individual caller at a remote terminal during the operations of the interface and coupling said remote terminal to an interface terminal for direct personal communication.

120. A process according to claim 119, further comprising the step of:

providing prompts to said interface terminal during direct personal communication with data relating to said calls from said individual callers.

121. A process in accordance with claim 119, wherein said step of aborting interaction is controlled by the success of said individual caller in accessing said memory.

122. A process according to claim 118, wherein said qualifying step limits access by said individual callers to a predetermined period of time based on entitlement.

123. A process according to claim 118, wherein said step for receiving said call data signals further includes:

receiving calling number identification data.

124. A process according to claim 123, wherein said processing step further includes processing of at least certain of said calling number identification data to test said calling number identification data to prevent excessive use.

125. An analysis control system for use with a communication facility including remote terminals for individual callers, wherein each of said remote terminals may comprise a conventional telephone instrument including voice communication means, and digital input means in the form of an array of alphabetic numeric buttons for providing data, said analysis control system comprising:

an interface structure coupled to said communication facility to interface said remote terminals for voice and digital communication, and including means to provide caller data signals representative of data relating to said individual callers developed by said remote terminals;

voice generator structure coupled through said interface structure for actuating said remote terminals as to provide vocal operating instructions to said individual callers;

record structure, including memory and control means, said record structure connected to receive said caller data signals from said interface structure for accessing a file relating to said individual callers including said individual callers' credit card numbers provided from said digital input means through said interface structure;

credit verification structure to verify on-line said credit card numbers wherein said credit verification structure at least verifies that said individual callers' credit card numbers have not been cancelled; and qualification structure controlled by said record structure for testing caller data signals provided by said individual callers to specify consumable participation keys for restricting the extent of access to at least a part of said system by said individual callers on the basis of entitlement.

126. An analysis control system according to claim 125, wherein said individual callers are prompted to provide certain of said caller data signals to identify said individual callers.

127. An analysis control system according to claim 125, wherein said caller data signals are indicative of initials of name or names.

128. An analysis control system according to claim 125, wherein said caller data signals are indicative of caller social security number data.

129. An analysis control system according to claim 125, wherein said caller data signals are indicative of caller PIN data.

130. An analysis control system according to claim 125, wherein calling number identification signals are automatically provided by said communication facility.

131. An analysis control system according to claim 130, wherein said caller data signals further are indicative of caller social security number data.

132. An analysis control system according to claim 131, wherein said qualification structure restricts said extent of access by each of said individual callers to a single use entitlement.

133. An analysis control system according to claim 125, wherein said qualification structure restricts said extent of access to a limited number of uses.

134. An analysis control system according to claim 125, wherein said interface structure includes means to receive one called number from a plurality of called numbers (DNIS).

135. An analysis control system according to claim 134, wherein said called number identifies one of a plurality of formats.

136. An analysis control system according to claim 125, further comprising:

structure to receive calling number identification data.

137. An analysis control system according to claim 136, wherein said record structure stores said calling number identification data at least in part.

138. An analysis control system according to claim 136, further comprising:

processing structure to process at least certain of said calling number identification data.

139. An analysis control system according to claim 125, wherein certain of said caller data signals provided by said individual callers are stored in said record structure.

140. An analysis control system according to claim 125, wherein said qualification structure restricts said extent of access by each of said individual callers to a single use entitlement.

141. An analysis control system according to claim 21, wherein said individual designations include sequence data and other caller data.

142. An analysis control system according to claim 27, wherein said individual callers provide said at least one other distinct identification data element on-line and said distinct identification data element is stored for subsequent use.

143. An analysis control system according to claim 109, wherein said computer generated numbers indicate a sequence in which calls from said individual callers occur.

144. An analysis control system according to claim 109, wherein said analysis structure processes at least certain of said data relating to certain select ones of said individual callers to isolate a subset of said individual callers.

145. A process according to claim 2, wherein entitled individual callers are only allowed access during a predetermined period of time.

146. A process according to claim 3, wherein entitled individual callers are only allowed access during a predetermined period of time.

147. An analysis control system according to claim 11, wherein said caller significance is indicative of a calling order sequence.

148. An analysis control system according to claim 27, wherein said interface structure further receives voice data from said individual callers and stores said voice data for subsequent processing.

149. An analysis control system according to claim 148, further comprising:
analysis structure coupled to said record structure for processing at least certain of said data developed by said remote terminals relating to certain select ones of said individual callers to isolate a subset of said callers.

150. An analysis control system according to claim 149, wherein said qualification structure further comprises test structure coupled to said interface structure for testing data provided by said individual callers specifying a limit on use during a predetermined period of time.

151. An analysis control system according to claim 36, wherein said one other distinct identification data is PIN number data.

152. A process according to claim 68, further comprising the step of:
receiving and storing voice data signals from said individual callers responsive to voice signals provided to said individual callers.

153. A process according to claim 152, further comprising the step of:
subsequently processing said stored voice data signals.

154. A process according to claim 152, further comprising the step of:
storing said digital identification data and said answer data from said individual callers.

155. A process according to claim 68, wherein said individual callers are further qualified by testing said participation numbers to determine whether said individual callers are calling during a predetermined period of time.

156. A process according to claim 155, wherein a clock is used to qualify said individual callers with respect to said period of time.

157. An analysis control system according to claim 68, wherein said select operating format is accessed by a pay to dial number identified by called number identification signals (DNIS) and said another of said plurality of operating formats is accessed by a number other than said pay to dial called number identified by called number identification signals (DNIS).

158. A process according to claim 79, further comprising the step of:
receiving and storing voice data signals from said individual callers responsive to voice signals provided to said individual callers.

159. A process according to claim 158, further comprising the step of:
subsequently processing said stored voice data signals.

160. A process according to claim 158, wherein said data relating to calls from said individual callers includes said digital identification data and said answer data from said individual callers.

161. A process according to claim 79, wherein said individual callers are further qualified by testing said participation numbers to determine whether said individual callers are calling during a predetermined period of time.

162. A process according to claim 161, wherein a clock is used to qualify said individual callers with respect to said period of time.

163. A process according to claim 162, wherein said predetermined period of time is determined by a use-rate calculator.

164. A process according to claim 87, further comprising the step of:
receiving and storing voice data signals from said individual callers responsive to voice signals provided to said individual callers.

165. A process according to claim 164, further comprising the step of:
subsequently processing stored voice data signals.

166. A process according to claim 164, wherein said data relating to calls from said individual callers includes said digital identification data and said answer data from said individual callers.

167. A process according to claim 87, wherein said individual callers are further qualified by testing said participation numbers to determine whether said individual callers are calling during a predetermined period of time.

168. A process according to claim 167, wherein a clock is used to qualify said individual callers with respect to said period of time.

169. An analysis control system according to claim 93, wherein said data relating to certain select ones of said individual callers includes credit card number data.

170. An analysis control system according to claim 169, wherein said data relating to certain select ones of said individual callers includes credit card expiration date data.

171. An analysis control system according to claim 169, wherein said credit card number data is tested against unacceptable credit card numbers.

172. An analysis control system according to claim 93, wherein said interface structure receives voice data which is stored for subsequent use.

173. An analysis control system according to claim 172, wherein at least certain of said data developed by said remote terminals and at least certain of said voice data is used in subsequent processing.

174. An analysis control system according to claim 173, wherein said subsequent processing includes isolating a subset of said individual callers.

175. An analysis control system according to claim 95, wherein said data relating to certain select ones of said individual callers includes credit card number data, which is tested by said qualification structure for entitlement.

176. An analysis control system according to claim 96, wherein said identification data signals are further indicative of caller billing identification data.

177. An analysis control system according to claim 109, wherein said interface structure receives calling number identification data signals automatically provided by said communication facility, which are tested by said qualification structure with respect to a limit on use to determine if at least certain of said individual callers are entitled to access.

178. An analysis control system according to 109, wherein said individual callers provide caller PIN number data online for subsequent identification of said individual callers.

179. An analysis control system according to claim 116, wherein said caller personal identification data is PIN number data.

180. An analysis control system according to claim 117, wherein at least certain of said individual callers are transferred to an operator attended terminal and at least certain of said data entered by said individual callers is displayed at said operator attended terminal.

181. A process for controlling operations of an interface with a telephone communication system, said process including the steps of:

providing key numbers specifying limits on use to entitle individual callers to access said operations of the interface with said telephone communication system;

coupling remote terminals to said interface for providing voice signals to said individual callers and generating said voice signals for actuating said remote terminals as to provide vocal operating instructions to specific ones of said individual callers;

receiving said key numbers as digital identification data from said individual callers responsive to said voice signals and answer data provided from said remote terminals under control of said individual callers;

qualifying said individual callers by testing to determine if said individual callers are entitled to access said operations of the interface by testing said key numbers for said individual callers against stored key numbers to ensure their validity and testing said key numbers based on said limits on use for said individual callers and accordingly providing approval signals for qualified individual callers;

accessing a memory with said key numbers for said individual callers and storing data relating to calls from said individual callers; and processing at least certain of said answer data responsive to said approval signals.

182. A process for controlling operations of an interface with a telephone communication system according to claim 181, where said key numbers are included in packaging of products.

183. A process for controlling operations of an interface with a telephone communication system according to claim 181, wherein certain of said voice signals provided to said individual callers indicate computer generated number data formed during operations of said interface.

184. A process for controlling operations of an interface with a telephone communication system according to claim 181, where said key numbers are coded.

185. A process for controlling operations of an interface with a telephone communication system according to claim 181, wherein said processing step processes answer data to isolate a subset of said individual callers.

186. A process for controlling operations of an interface with a telephone communication system according to claim 181, wherein said individual callers provide credit card number data as additional digital identification data or said answer data, which is verified and stored in said memory.

187. A process for controlling operations of an interface with a telephone communication system according to claim 181, wherein said operations of the interface are in accordance with a select processing format of a plurality of processing formats identified by called terminal digital data signals (DNIS) provided automatically by said telephone communication system, further comprising the steps of:

providing access to said operations of the interface in accordance with said select processing format with a pay to dial number and providing access to said operations of the interface in accordance with another of said processing formats with a number other than said pay to dial number.

188. A process for controlling operations of an interface with a telephone communications system, said process including the steps of:

providing products carrying key numbers for participation specifying limits on use to entitle individual callers to access said operations of the interface with said telephone communications system;

coupling remote terminals to said interface for providing voice signals to said individual callers and generating said voice signals for actuating said remote terminals as to provide voice operating instructions to specific ones of said individual callers;

receiving digital identification data from said individual callers responsive to said voice signals including said key numbers for said individual callers and answer data provided from said remote terminals under control of said individual callers;

qualifying said individual callers by testing to determine if said individual callers are entitled to access said operations of the interface based on said limits on use specified by said key numbers for said individual callers and accordingly providing approval signals for qualified callers;

accessing a memory with said key numbers for said individual callers and storing data relating to calls from said individual callers; and providing certain of said voice signals to said individual callers to indicate computer generated number data formed during operations of the interface.

189. A process according to claim 188, wherein said computer generated number data is stored in said memory.

190. A process according to claim 189, wherein said computer generated number data is stored in association with said digital identification data.

191. A process according to claim 188, further comprising the step of:

providing said key numbers in packaging of said products.

192. A process according to claim 188, further comprising the step of:

processing at least certain of said answer data to isolate a subset of callers.

193. A process according to claim 188, wherein caller credit card number data is received from said individual callers as additional digital identification data or said answer data.

194. A process according to claim 188, wherein said computer generated number data is indicative of a calling order sequence of said individual callers.

195. An analysis control system for use with a communication facility including remote terminals for individual callers, wherein each of said remote terminals may comprise a conventional telephone instrument including voice communication means and digital input means in the form of an array of alphabetic numeric buttons for providing data, said analysis control system comprising:

- interface structure coupled to said communication facility to interface said remote terminals for voice and digital communication and including means to provide signals representative of data developed by said remote terminals and including structure to control processing formats of said analysis control system in accordance with signals automatically provided by said communication facility indicative of one of a plurality of called numbers (DNIS) wherein said one of a plurality of called numbers identifies a select processing format from a plurality of processing formats;
- voice generator structure selectively coupled through said interface structure to said remote terminals for providing vocal operating instructions to individual ones of said callers;
- record memory connected to said interface structure for accessing a file and storing data relating to certain select ones of said individual callers including voice data and digital data developed by said remote terminals; and
- analysis structure connected to said record memory for processing at least certain of said data relating to certain select ones of said individual callers to isolate a subset of said callers, wherein processing of said certain of said data includes accumulating multiple different personal identifying data provided by said select ones of said individual callers and considering said multiple different data by logic comparisons to isolate said subset of said callers.

196. An analysis control system according to claim 195, wherein certain of said caller data signals provided by said individual callers are stored in said record structure.

197. An analysis control system according to claim 195, wherein said analysis structure provides individual designations including sequence data and other caller data.

198. An analysis control system according to claim 195, wherein said select processing format is accessed by a pay to dial called number received over a pay to dial network and identified by called number identification data signals (DNIS).

199. An analysis control system according to claim 198, wherein at least one other of said processing formats is accessed by a number other than said pay to dial called number and identified by called number identification data signals (DNIS).

200. An analysis control system according to claim 199, further comprising:

- qualification structure coupled to said interface structure for qualifying at least certain of said individual callers for access to said select processing format by testing key numbers specifying a limit on use provided by said certain of said individual callers as part of said digital data developed by said remote terminals.

201. An analysis control system according to claim 200, wherein said digital data developed by remote terminals includes personal information data on at least said certain of said individual callers including age data.

202. A process according to claim 122, further including a step of limiting access by a caller to said memory under control of a clock.

* * * * *

UNITED STATES PATENT AND TRADEMARK OFFICE
CERTIFICATE OF CORRECTION

PATENT NO. : 5,684,863

DATED : November 4, 1997

INVENTOR(S) : Ronald A. Katz

Page 1 of 2

It is certified that error appears in the above-identified patent and that said Letters Patent is hereby corrected as shown below:

Column 7, line 29, after "response", --is-- should be inserted.

Column 10, line 52, "maybe" should be --may be--.

Column 12, line 12, there should be no comma after "from".

Column 16, line 28, there should be no comma after "qualified".

Column 18, line 12, "Comprehensive" should be --comprehensive--.

Column 19, line 6, "fur" should be --for--.

IN THE CLAIMS:

Column 27, line 21, in claim 59, "test" should be --tests--.

Column 29, line 61, in claim 79, before "remote", "an" should be --a--.

UNITED STATES PATENT AND TRADEMARK OFFICE
CERTIFICATE OF CORRECTION

PATENT NO. : 5,684,863
DATED : November 4, 1997
INVENTOR(S) : Ronald A. Katz

It is certified that error appears in the above-identified patent and that said Letters Patent is hereby corrected as shown below:

Column 31, line 9, in claim 92, "An" should be --A--.

Signed and Sealed this

Twenty-ninth Day of May, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,684,863
DATED : November 4, 1997
INVENTOR(S) : Ronald A. Katz

It is certified that error appears in the above-identified patent and that said Letters Patent is hereby corrected as shown below:

Column 22,
Line 58, after "structure", insert -- and --.

Signed and Sealed this

Third Day of May, 2005

JON W. DUDAS
*Director of the United States Patent and Trademark Office*

(12) EX PARTE REEXAMINATION CERTIFICATE (10163rd)
United States Patent
Katz

(10) Number: US 5,684,863 C1
(45) Certificate Issued: May 15, 2014

(54) TELEPHONIC-INTERFACE STATISTICAL ANALYSIS SYSTEM

(75) Inventor: Ronald A. Katz, Los Angeles, CA (US)

(73) Assignee: General Electric Capital Corporation, Atlanta, GA (US)

Reexamination Request:
No. 90/008,095, Jul. 14, 2006

Reexamination Certificate for:
Patent No.: 5,684,863
Issued: Nov. 4, 1997
Appl. No.: 08/476,662
Filed: Jun. 7, 1995

Certificate of Correction issued May 29, 2001
Certificate of Correction issued May 3, 2005

Related U.S. Application Data

(63) Continuation of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
*H04Q 3/64* (2006.01)
*H04M 3/50* (2006.01)
(Continued)

(52) U.S. Cl.
USPC ..... 379/88.18; 379/196; 379/245; 379/93.02; 379/112.01; 379/114.11; 379/114.14; 379/142.06; 379/207.13; 379/207.14; 379/265.02

(58) Field of Classification Search
None
See application file for complete search history.

(56) References Cited

To view the complete listing of prior art documents cited during the proceeding for Reexamination Control Number 90/008,095, please refer to the USPTO's public Patent Application Information Retrieval (PAIR) system under the Display References tab.

*Primary Examiner* — Erik Kielin

(57) ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

At the time of issuance and publication of this certificate, the patent remains subject to pending reexamination control numbers 90/011,457, 90/011,515, 90/012,062, 90/012,071, 90/012,407, 90/012,799, and 90/013,081 filed Jan. 25, 2011, Feb. 28, 2011, Dec. 19, 2011, Dec. 23, 2011, Jul. 26, 2012, Feb. 18, 2013, and Dec. 5, 2013 respectively. The claim content of the patent may be subsequently revised if a reexamination certificate issues from the reexamination proceedings.

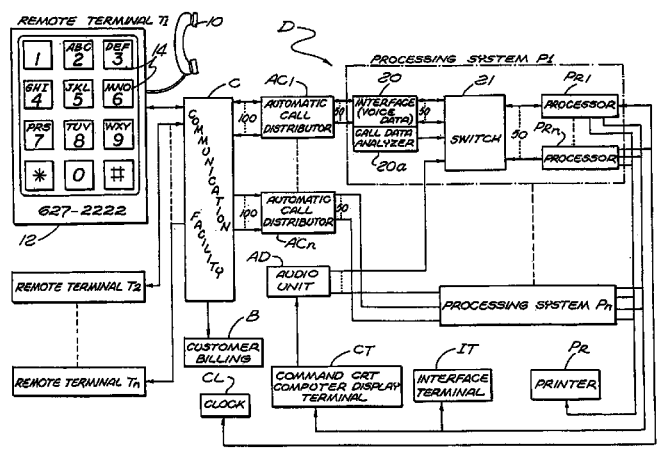

(51) Int. Cl.
| | | | |
|---|---|---|---|
| *H04M 3/42* | (2006.01) | *H04M 3/493* | (2006.01) |
| *A63F 3/08* | (2006.01) | *H04M 3/51* | (2006.01) |
| *G07C 11/00* | (2006.01) | *H04M 11/00* | (2006.01) |
| *G07C 15/00* | (2006.01) | *H04Q 3/00* | (2006.01) |
| *H04M 3/36* | (2006.01) | *H04Q 3/545* | (2006.01) |
| *H04M 3/38* | (2006.01) | *H04Q 3/66* | (2006.01) |
| *H04M 3/436* | (2006.01) | *H04Q 3/72* | (2006.01) |
| *H04M 3/46* | (2006.01) | *H04Q 3/74* | (2006.01) |
| | | *H04M 3/487* | (2006.01) |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 109 is confirmed.

Claims 27, 93, 181, 183 and 185 are cancelled.

Claims 1-26, 28-92, 94-108, 110-180, 182, 184 and 186-202 were not reexamined.

* * * * *

US005684863C2

(12) EX PARTE REEXAMINATION CERTIFICATE (10185th)

United States Patent
Katz

(10) Number: US 5,684,863 C2
(45) Certificate Issued: Jun. 9, 2014

(54) TELEPHONIC-INTERFACE STATISTICAL ANALYSIS SYSTEM

(75) Inventor: Ronald A. Katz, Los Angeles, CA (US)

(73) Assignee: General Electric Capital Corporation, Atlanta, GA (US)

Reexamination Request:
No. 90/013,081, Dec. 5, 2013

Reexamination Certificate for:
Patent No.: 5,684,863
Issued: Nov. 4, 1997
Appl. No.: 08/476,662
Filed: Jun. 7, 1995

Reexamination Certificate C1 5,684,863 issued May 15, 2014

Certificate of Correction issued May 29, 2001
Certificate of Correction issued May 3, 2005

Related U.S. Application Data

(63) Continuation of application No. 07/335,923, filed on Apr. 10, 1989, now Pat. No. 6,016,344, which is a (Continued)

(51) Int. Cl.
| | |
|---|---|
| *H04Q 3/64* | (2006.01) |
| *H04M 3/50* | (2006.01) |
| *H04M 3/42* | (2006.01) |
| *A63F 3/08* | (2006.01) |
| *G07C 11/00* | (2006.01) |
| *G07C 15/00* | (2006.01) |
| *H04M 3/36* | (2006.01) |
| *H04M 3/38* | (2006.01) |
| *H04M 3/436* | (2006.01) |
| *H04M 3/46* | (2006.01) |
| *H04M 3/493* | (2006.01) |
| *H04M 3/51* | (2006.01) |
| *H04M 11/00* | (2006.01) |
| *H04Q 3/00* | (2006.01) |
| *H04Q 3/545* | (2006.01) |
| *H04Q 3/66* | (2006.01) |
| *H04Q 3/72* | (2006.01) |
| *H04Q 3/74* | (2006.01) |
| *H04M 3/487* | (2006.01) |

(52) U.S. Cl.
USPC ..... 379/88.18; 379/196; 379/245; 379/93.02; 379/112.01; 379/114.11; 379/114.14; 379/142.06; 379/207.13; 379/207.14; 379/265.02

(58) Field of Classification Search
None
See application file for complete search history.

(56) References Cited

To view the complete listing of prior art documents cited during the proceeding for Reexamination Control Number 90/013,081, please refer to the USPTO's public Patent Application Information Retrieval (PAIR) system under the Display References tab.

*Primary Examiner* — Erik Kielin

(57) ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

At the time of issuance and publication of this certificate, the patent remains subject to pending reexamination control numbers 90/011,457, 90/011,515, 90/012,062, 90/012,071, 90/012,407, and 90/012,799 filed Jan. 25, 2011, Feb. 28, 2011, Dec. 19, 2011, Dec. 23, 2011, Jul. 26, 2012, and Feb. 18, 2013 respectively. The claim content of the patent may be subsequently revised if a reexamination certificate issues from the reexamination proceedings.

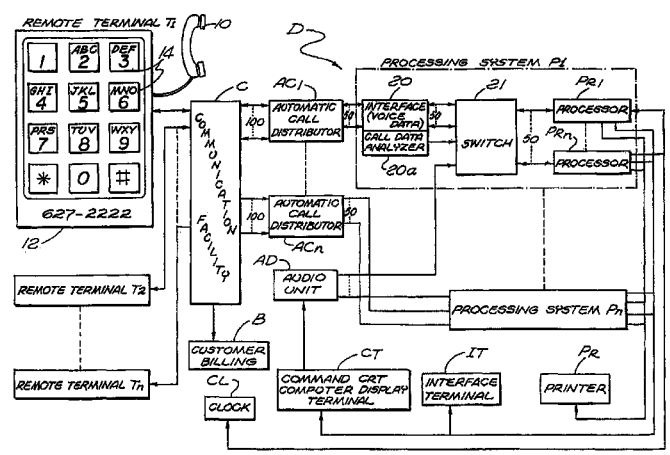

Related U.S. Application Data continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 22 is confirmed.

Claims 27, 93, 181, 183 and 185 were previously cancelled.

Claims 1-21, 23-26, 28-92, 94-180, 182, 184 and 186-202 were not reexamined.

\* \* \* \* \*

(12) EX PARTE REEXAMINATION CERTIFICATE (10276th)
United States Patent
Katz

(10) Number: US 5,684,863 C3
(45) Certificate Issued: Aug. 27, 2014

(54) TELEPHONIC-INTERFACE STATISTICAL ANALYSIS SYSTEM

(75) Inventor: Ronald A. Katz, Los Angeles, CA (US)

(73) Assignee: General Electric Capital Corporation, Atlanta, GA (US)

Reexamination Request:
No. 90/011,457, Jan. 25, 2011
No. 90/011,515, Feb. 28, 2011

Reexamination Certificate for:
Patent No.: 5,684,863
Issued: Nov. 4, 1997
Appl. No.: 08/476,662
Filed: Jun. 7, 1995

Reexamination Certificate C1 5,684,863 issued May 15, 2014

Reexamination Certificate C2 5,684,863 issued Jun. 9, 2014

Certificate of Correction issued May 29, 2001
Certificate of Correction issued May 3, 2005

Related U.S. Application Data

(63) Continuation of application No. 07/335,923, filed on Apr. 10, 1989, now Pat. No. 6,016,344, which is a (Continued)

(51) Int. Cl.
*H04Q 3/64* (2006.01)

(Continued)

(52) U.S. Cl.
USPC ..... 379/88.18; 379/196; 379/245; 379/93.02; 379/112.01; 379/114.11; 379/114.14; 379/142.06; 379/207.13; 379/207.14; 379/265.02

(58) Field of Classification Search
None
See application file for complete search history.

(56) References Cited

To view the complete listing of prior art documents cited during the proceedings for Reexamination Control Numbers 90/011,457 and 90/011,515, please refer to the USPTO's public Patent Application Information Retrieval (PAIR) system under the Display References tab.

*Primary Examiner* — Erik Kielin

(57) ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

At the time of issuance and publication of this certificate, the patent remains subject to pending reexamination control numbers 90/012,062, 90/012,071, 90/012,407, and 90/012,799 filed Dec. 19, 2011, Dec. 23, 2011, Jul. 26, 2012, and Feb. 18, 2013 respectively. The claim content of the patent may be subsequently revised if a reexamination certificate issues from the reexamination proceedings.

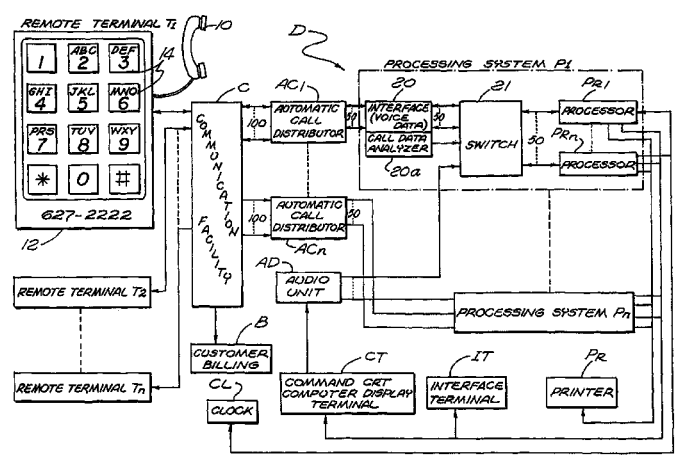

Related U.S. Application Data continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.

| | |
|---|---|
| *H04M 3/50* | (2006.01) |
| *H04M 3/42* | (2006.01) |
| *A63F 3/08* | (2006.01) |
| *G07C 11/00* | (2006.01) |
| *G07C 15/00* | (2006.01) |
| *H04M 3/36* | (2006.01) |
| *H04M 3/38* | (2006.01) |
| *H04M 3/436* | (2006.01) |
| *H04M 3/46* | (2006.01) |
| *H04M 3/493* | (2006.01) |
| *H04M 3/51* | (2006.01) |
| *H04M 11/00* | (2006.01) |
| *H04Q 3/00* | (2006.01) |
| *H04Q 3/545* | (2006.01) |
| *H04Q 3/66* | (2006.01) |
| *H04Q 3/72* | (2006.01) |
| *H04Q 3/74* | (2006.01) |
| *H04M 3/487* | (2006.01) |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 42 and 43 is confirmed.

Claims 27, 93, 181, 183 and 185 were previously cancelled.

Claims 31 and 49 are cancelled.

Claims 1-26, 28-30, 32-41, 44-48, 50-92, 94-180, 182, 184 and 186-202 were not reexamined.

* * * * *

(12) EX PARTE REEXAMINATION CERTIFICATE (10437th)
United States Patent
Katz

(10) Number: US 5,684,863 C4
(45) Certificate Issued: Dec. 12, 2014

(54) TELEPHONIC-INTERFACE STATISTICAL ANALYSIS SYSTEM

(75) Inventor: Ronald A. Katz, Los Angeles, CA (US)

(73) Assignee: General Electric Capital Corporation, Atlanta, GA (US)

Reexamination Request:
No. 90/012,799, Feb. 18, 2013

Reexamination Certificate for:
Patent No.: 5,684,863
Issued: Nov. 4, 1997
Appl. No.: 08/476,662
Filed: Jun. 7, 1995

Reexamination Certificate C1 5,684,863 issued May 15, 2014
Reexamination Certificate C2 5,684,863 issued Jun. 9, 2014
Reexamination Certificate C3 5,684,863 issued Aug. 27, 2014

Certificate of Correction issued May 29, 2001
Certificate of Correction issued May 3, 2005

Related U.S. Application Data

(63) Continuation of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
*H04Q 3/64* (2006.01)
*H04M 3/50* (2006.01)
(Continued)

(52) U.S. Cl.
USPC ..... 379/88.18; 379/196; 379/245; 379/93.02; 379/112.01; 379/114.11; 379/114.14; 379/142.06; 379/207.13; 379/207.14; 379/265.02

(58) Field of Classification Search
None
See application file for complete search history.

(56) References Cited

To view the complete listing of prior art documents cited during the proceeding for Reexamination Control Number 90/012,799, please refer to the USPTO's public Patent Application Information Retrieval (PAIR) system under the Display References tab.

*Primary Examiner* — Stephen J Ralis

(57) ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

At the time of issuance and publication of this certificate, the patent remains subject to pending reexamination control numbers 90/012,062, 90/012,071, and 90/012,407 filed Dec. 19, 2001, Dec. 23, 2011, and Jul. 26, 2012 respectively. The claim content of the patent may be subsequently revised if a reexamination certificate issues from the reexamination proceedings.

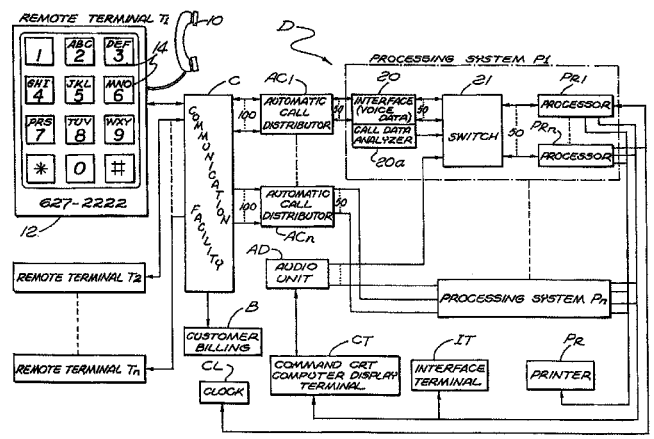

(51) Int. Cl.
*H04M 3/42* (2006.01)
*A63F 3/08* (2006.01)
*G07C 11/00* (2006.01)
*G07C 15/00* (2006.01)
*H04M 3/36* (2006.01)
*H04M 3/38* (2006.01)
*H04M 3/436* (2006.01)
*H04M 3/46* (2006.01)
*H04M 3/493* (2006.01)
*H04M 3/51* (2006.01)
*H04M 11/00* (2006.01)
*H04Q 3/00* (2006.01)
*H04Q 3/545* (2006.01)
*H04Q 3/66* (2006.01)
*H04Q 3/72* (2006.01)
*H04Q 3/74* (2006.01)
*H04M 3/487* (2006.01)

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 27, 31, 49, 93, 181, 183 and 185 were previously cancelled.

Claims 42, 44 and 50 are cancelled.

Claims 1-26, 28-30, 32-41, 43, 45-48, 51-92, 94-180, 182, 184 and 186-202 were not reexamined.

* * * * *

(12) EX PARTE REEXAMINATION CERTIFICATE (10706th)
United States Patent
Katz

(10) Number: US 5,684,863 C5
(45) Certificate Issued: Sep. 9, 2015

(54) TELEPHONIC-INTERFACE STATISTICAL ANALYSIS SYSTEM

(75) Inventor: Ronald A. Katz, Los Angeles, CA (US)

(73) Assignee: GENERAL ELECTRIC CAPITAL CORPORATION, Atlanta, GA (US)

Reexamination Request:
No. 90/012,062, Dec. 19, 2011
No. 90/012,071, Dec. 23, 2011

Reexamination Certificate for:
Patent No.: 5,684,863
Issued: Nov. 4, 1997
Appl. No.: 08/476,662
Filed: Jun. 7, 1995

Reexamination Certificate C1 5,684,863 issued May 15, 2014

Reexamination Certificate C2 5,684,863 issued Jun. 9, 2014

Reexamination Certificate C3 5,684,863 issued Aug. 27, 2014

Reexamination Certificate C4 5,684,863 issued Dec. 12, 2014

Certificate of Correction issued May 29, 2001
Certificate of Correction issued May 3, 2005

Related U.S. Application Data

(63) Continuation of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
*H04Q 3/64* (2006.01)
*H04M 3/50* (2006.01)
*H04M 3/42* (2006.01)
(Continued)

(52) U.S. Cl.
CPC ............... *H04Q 3/665* (2013.01); *G07C 11/00* (2013.01); *G07C 15/005* (2013.01);
(Continued)

(58) Field of Classification Search
None
See application file for complete search history.

(56) References Cited

To view the complete listing of prior art documents cited during the proceedings for Reexamination Control Numbers 90/012,062 and 90/012,071, please refer to the USPTO's public Patent Application Information Retrieval (PAIR) system under the Display References tab.

*Primary Examiner* — Stephen J Ralis

(57) ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

At the time of issuance and publication of this certificate, the patent remains subject to pending reexamination control number 90/012,407 filed Jul. 26, 2012. The claim content of the patent may be subsequently revised if a reexamination certificate issues from the reexamination proceeding.

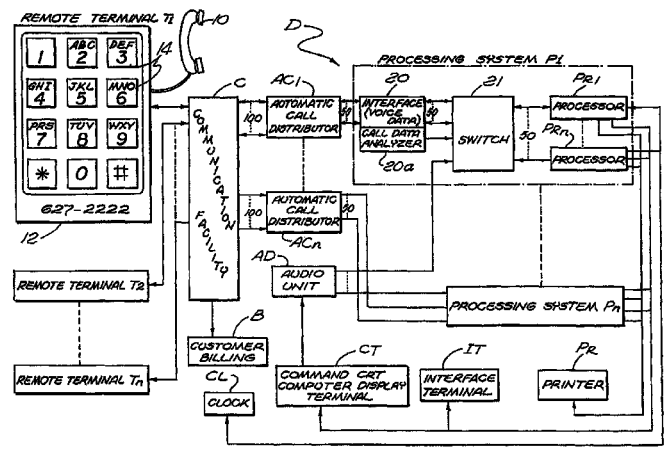

(51) Int. Cl.
*A63F 3/08* (2006.01)
*G07C 11/00* (2006.01)
*G07C 15/00* (2006.01)
*H04M 3/36* (2006.01)
*H04M 3/38* (2006.01)
*H04M 3/436* (2006.01)
*H04M 3/46* (2006.01)
*H04M 3/493* (2006.01)
*H04M 3/51* (2006.01)
*H04M 11/00* (2006.01)
*H04Q 3/00* (2006.01)
*H04Q 3/545* (2006.01)
*H04Q 3/66* (2006.01)
*H04Q 3/72* (2006.01)
*H04Q 3/74* (2006.01)
*H04M 3/487* (2006.01)

(52) U.S. Cl.
CPC ............... *G07C 15/006* (2013.01); *H04M 3/36* (2013.01); *H04M 3/38* (2013.01); *H04M 3/46* (2013.01); *H04M 3/493* (2013.01); *H04M 3/51* (2013.01); *H04M 11/00* (2013.01); *H04Q 3/002* (2013.01); *H04Q 3/5455* (2013.01); *H04Q 3/54533* (2013.01); *H04Q 3/54591* (2013.01); *H04Q 3/72* (2013.01); *H04Q 3/74* (2013.01); *A63F 2003/086* (2013.01); *G07C 2011/04* (2013.01); *H04M 3/42042* (2013.01); *H04M 3/42059* (2013.01); *H04M 3/42102* (2013.01); *H04M 3/436* (2013.01); *H04M 2201/40* (2013.01); *H04M 2203/2016* (2013.01); *H04M 2242/22* (2013.01); *H04Q 2213/1309* (2013.01); *H04Q 2213/1313* (2013.01); *H04Q 2213/1316* (2013.01); *H04Q 2213/1322* (2013.01); *H04Q 2213/1328* (2013.01); *H04Q 2213/1332* (2013.01); *H04Q 2213/1333* (2013.01); *H04Q 2213/13034* (2013.01); *H04Q 2213/1337* (2013.01); *H04Q 2213/13072* (2013.01); *H04Q 2213/13091* (2013.01); *H04Q 2213/13093* (2013.01); *H04Q 2213/13095* (2013.01); *H04Q 2213/13096* (2013.01); *H04Q 2213/13097* (2013.01); *H04Q 2213/13103* (2013.01); *H04Q 2213/13106* (2013.01); *H04Q 2213/13107* (2013.01); *H04Q 2213/13136* (2013.01); *H04Q 2213/13141* (2013.01); *H04Q 2213/13173* (2013.01); *H04Q 2213/13174* (2013.01); *H04Q 2213/13175* (2013.01); *H04Q 2213/13178* (2013.01); *H04Q 2213/13204* (2013.01); *H04Q 2213/13213* (2013.01); *H04Q 2213/13214* (2013.01); *H04Q 2213/13216* (2013.01); *H04Q 2213/13256* (2013.01); *H04Q 2213/13349* (2013.01); *H04Q 2213/13375* (2013.01); *H04Q 2213/13376* (2013.01); *H04Q 2213/13377* (2013.01); *H04Q 2213/13405* (2013.01)

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 27, 31, 42, 44, 49, 50, 93, 181, 183 and 185 were previously cancelled.

Claims 32, 39, 96, 98 and 99 are cancelled.

Claims 1-26, 28-30, 33-38, 40, 41, 43, 45-48, 51-92, 94, 95, 97, 100-180, 182, 184 and 186-202 were not reexamined.

\* \* \* \* \*

US005684863C6

(12) EX PARTE REEXAMINATION CERTIFICATE (10794th)
United States Patent
Katz

(10) Number: US 5,684,863 C6
(45) Certificate Issued: Jan. 8, 2016

(54) TELEPHONIC-INTERFACE STATISTICAL ANALYSIS SYSTEM

(75) Inventor: Ronald A. Katz, Los Angeles, CA (US)

(73) Assignee: GENERAL ELECTRIC CAPITAL CORPORATION, Atlanta, GA (US)

Reexamination Request:
No. 90/012,407, Jul. 26, 2012

Reexamination Certificate for:
Patent No.: 5,684,863
Issued: Nov. 4, 1997
Appl. No.: 08/476,662
Filed: Jun. 7, 1995

Reexamination Certificate C1 5,684,863 issued May 15, 2014

Reexamination Certificate C2 5,684,863 issued Jun. 9, 2014

Reexamination Certificate C3 5,684,863 issued Aug. 27, 2014

Reexamination Certificate C4 5,684,863 issued Dec. 12, 2014

Reexamination Certificate C5 5,684,863 issued Sep. 9, 2015

Certificate of Correction issued May 29, 2001
Certificate of Correction issued May 3, 2005

Related U.S. Application Data

(63) Continuation of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
*G07C 15/00* (2006.01)
*G07C 11/00* (2006.01)
*H04Q 3/74* (2006.01)
(Continued)

(52) U.S. Cl.
CPC ............... *H04Q 3/665* (2013.01); *G07C 11/00* (2013.01); *G07C 15/005* (2013.01); *G07C 15/006* (2013.01); *H04M 3/36* (2013.01);
(Continued)

(58) Field of Classification Search
None
See application file for complete search history.

(56) References Cited

To view the complete listing of prior art documents cited during the proceeding for Reexamination Control Number 90/012,407, please refer to the USPTO's public Patent Application Information Retrieval (PAIR) system under the Display References tab.

*Primary Examiner* — Kenneth J Whittington

(57) ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

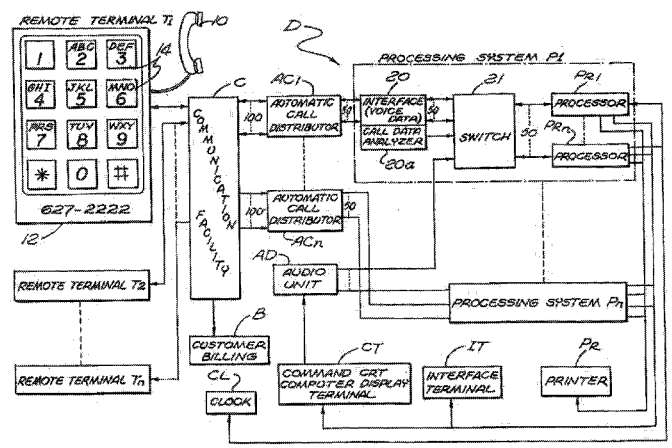

(51) Int. Cl.
*H04M 11/00* (2006.01)
*H04Q 3/72* (2006.01)
*H04M 3/36* (2006.01)
*H04Q 3/66* (2006.01)
*H04Q 3/00* (2006.01)
*H04M 3/51* (2006.01)
*H04M 3/46* (2006.01)
*H04Q 3/64* (2006.01)
*H04M 3/38* (2006.01)
*H04M 3/493* (2006.01)
*H04Q 3/545* (2006.01)
*H04M 3/42* (2006.01)
*A63F 3/08* (2006.01)
*H04M 3/436* (2006.01)

(52) U.S. Cl.
CPC  *H04M 3/38* (2013.01); *H04M 3/46* (2013.01); *H04M 3/493* (2013.01); *H04M 3/51* (2013.01); *H04M 11/00* (2013.01); *H04Q 3/002* (2013.01); *H04Q 3/5455* (2013.01); *H04Q 3/54533* (2013.01); *H04Q 3/54591* (2013.01); *H04Q 3/72* (2013.01); *H04Q 3/74* (2013.01); *A63F 2003/086* (2013.01); *G07C 2011/04* (2013.01); *H04M 3/42042* (2013.01); *H04M 3/42059* (2013.01); *H04M 3/42102* (2013.01); *H04M 3/436* (2013.01); *H04M 2201/40* (2013.01); *H04M 2203/2016* (2013.01); *H04M 2242/22* (2013.01); *H04Q 2213/1309* (2013.01); *H04Q 2213/1313* (2013.01); *H04Q 2213/1316* (2013.01); *H04Q 2213/1322* (2013.01); *H04Q 2213/1328* (2013.01); *H04Q 2213/1332* (2013.01); *H04Q 2213/1333* (2013.01); *H04Q 2213/13034* (2013.01);*H04Q 2213/1337* (2013.01); *H04Q 2213/13072* (2013.01); *H04Q 2213/13091* (2013.01); *H04Q 2213/13093* (2013.01); *H04Q 2213/13095* (2013.01); *H04Q 2213/13096* (2013.01); *H04Q 2213/13097* (2013.01); *H04Q 2213/13103* (2013.01); *H04Q 2213/13106* (2013.01); *H04Q 2213/13107* (2013.01); *H04Q 2213/13136* (2013.01); *H04Q 2213/13141* (2013.01); *H04Q 2213/13173* (2013.01); *H04Q 2213/13174* (2013.01); *H04Q 2213/13175* (2013.01); *H04Q 2213/13178* (2013.01); *H04Q 2213/13204* (2013.01); *H04Q 2213/13213* (2013.01); *H04Q 2213/13214* (2013.01); *H04Q 2213/13216* (2013.01); *H04Q 2213/13256* (2013.01); *H04Q 2213/13349* (2013.01); *H04Q 2213/13375* (2013.01); *H04Q 2213/13376* (2013.01); *H04Q 2213/13377* (2013.01); *H04Q 2213/13405* (2013.01)

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 27, 31, 32, 39, 42, 44, 49, 50, 93, 96, 98, 99, 181, 183 and 185 were previously cancelled.

Claims 43 and 116 are cancelled.

Claims 1-26, 28-30, 33-38, 40, 41, 45-48, 51-92, 94, 95, 97, 100-115, 117-180, 182, 184 and 186-202 were not reexamined.

\* \* \* \* \*